US011902208B2

United States Patent
Bai et al.

(10) Patent No.: US 11,902,208 B2
(45) Date of Patent: Feb. 13, 2024

(54) NON-SERVING CELL STATES

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/548,051

(22) Filed: Dec. 10, 2021

(65) Prior Publication Data

US 2022/0216969 A1 Jul. 7, 2022

Related U.S. Application Data

(60) Provisional application No. 63/134,483, filed on Jan. 6, 2021.

(51) Int. Cl.
*H04L 5/00* (2006.01)

(52) U.S. Cl.
CPC .......... *H04L 5/0053* (2013.01); *H04L 5/0048* (2013.01)

(58) Field of Classification Search
CPC .............................. H04L 5/0053; H04L 5/0048
See application file for complete search history.

(56) References Cited

U.S. PATENT DOCUMENTS

| 2020/0314818 | A1* | 10/2020 | Jin | H04W 72/046 |
| 2022/0217705 | A1* | 7/2022 | Zhou | H04L 5/0058 |
| 2022/0322115 | A1* | 10/2022 | Zhou | H04W 24/08 |
| 2023/0180141 | A1* | 6/2023 | Zhou | H04L 5/001 |

OTHER PUBLICATIONS

Ericsson: "Enhancements to Multi-Beam Operation", R1-2005842, 3GPP TSG-RAN WG1 Meeting #102-e, 3rd Generation Partnership Project, Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 7, 2020, XP051915067, 16 Pages.

Futurewei: "Enhancement on Multi-Beam Operation", R1-2007546, 3GPP TSG RAN WG1 Meeting #103-e, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 23, 2020, XP051945273, 9 Pages.

OPPO: "Text Proposals for Multi-Beam Operation Enhancement", R1-2005976, 3GPP TSG RAN WG1 #102-e, 3rd Generation Partnership Project, Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 7, 2020, XP051915092, 7 Pages.

(Continued)

*Primary Examiner* — Ronald B Abelson
(74) *Attorney, Agent, or Firm* — Shumaker & Sieffert, P.A.

(57) ABSTRACT

A wireless communication device is described. The wireless communication device includes a receiver configured to receive a message indicating a transmission configuration indicator (TCI) state. The wireless communication device also includes a processor configured to determine the TCI state based on the message, a non-serving cell identifier, and a received reference signal from a non-serving cell.

34 Claims, 10 Drawing Sheets

(56) References Cited

OTHER PUBLICATIONS

Samsung: "Further Enhancements on MIMO for NR", 3GPP TSG RAN Meeting #90-e, RP-202299, 3rd Generation Partnership Project, Mobile Competence Centre, 650, Route Des Lucioles, F-06921, Sophia-Antipolis Cedex, France, vol. TSG RAN, No. Electronic Meeting, Dec. 7, 2020-Dec. 11, 2020, Nov. 27, 2020, XP051960316, 15 Pages.

Ericsson: "Enhancements to Multi-Beam Operation", R1-2005842, 3GPP TSG-RAN WG1 Meeting #102-e, 3rd Generation Partnership Project, Mobile Competence Centre, 650, Route Des Lucioles, F-06921, Sophia-Antipolis Cedex, France, vol. RAN WG1, No. e-Meeting, 20200817-20200828, Aug. 7, 2020, XP051915067, 16 Pages.

Futurewei: "Enhancement on Multi-Beam Operation", R1-2007546, 3GPP TSG RAN WG1 Meeting #103-e, 3rd Generation Partnership Project, Mobile Competence Centre, 650, Route Des Lucioles, F-06921 Sophia-Antipolis Cedex, France, vol. RAN WG1, No. e-Meeting, 20201026-20201113, Oct. 23, 2020, XP051945273, 9 Pages.

International Search Report and Written Opinion—PCT/US2022/070015—ISA/EPO—dated Apr. 25, 2022, 15 Pages.

OPPO: "Text Proposals for Multi-Beam Operation Enhancement", R1-2005976, 3GPP TSG RAN WG1 #102-e, 3rd Generation Partnership Project, Mobile Competence Centre, 650, Route Des Lucioles, F-06921, Sophia-Antipolis Cedex, France, vol. RAN WG1, No. e-Meeting, 20200817-20200828, Aug. 7, 2020, XP051915092, 7 Pages.

Samsung: "Further Enhancements on MIMO for NR", 3GPP TSG RAN Meeting #90-e, RP-202299, 3rd Generation Partnership Project, Mobile Competence Centre, 650, Route Des Lucioles, F-06921, Sophia-Antipolis Cedex, France, vol. TSG RAN, No. Electronic Meeting, 20201207-20201211, Nov. 27, 2020, XP051960316, 15 Pages.

* cited by examiner

NON-SERVING CELL STATES

CROSS-REFERENCE TO RELATED APPLICATION(S)

This application claims benefit of and priority to U.S. Provisional Application No. 63/134,483, filed Jan. 6, 2021, which is hereby assigned to the assignee hereof and hereby expressly incorporated by reference herein in its entirety as if fully set forth below and for all applicable purposes.

BACKGROUND

Field of the Disclosure

The present disclosure relates generally to electronic devices. More specifically, the present disclosure relates to non-serving cell states.

Description of Related Art

In the last several decades, the use of electronic devices has expanded. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently, or with higher quality are often sought after.

Some electronic devices (e.g., cellular phones, smartphones, laptop computers, etc.) communicate with other electronic devices. For example, electronic devices may transmit and/or receive radio frequency (RF) signals to communicate.

DETAILED DESCRIPTION

Figure 1:
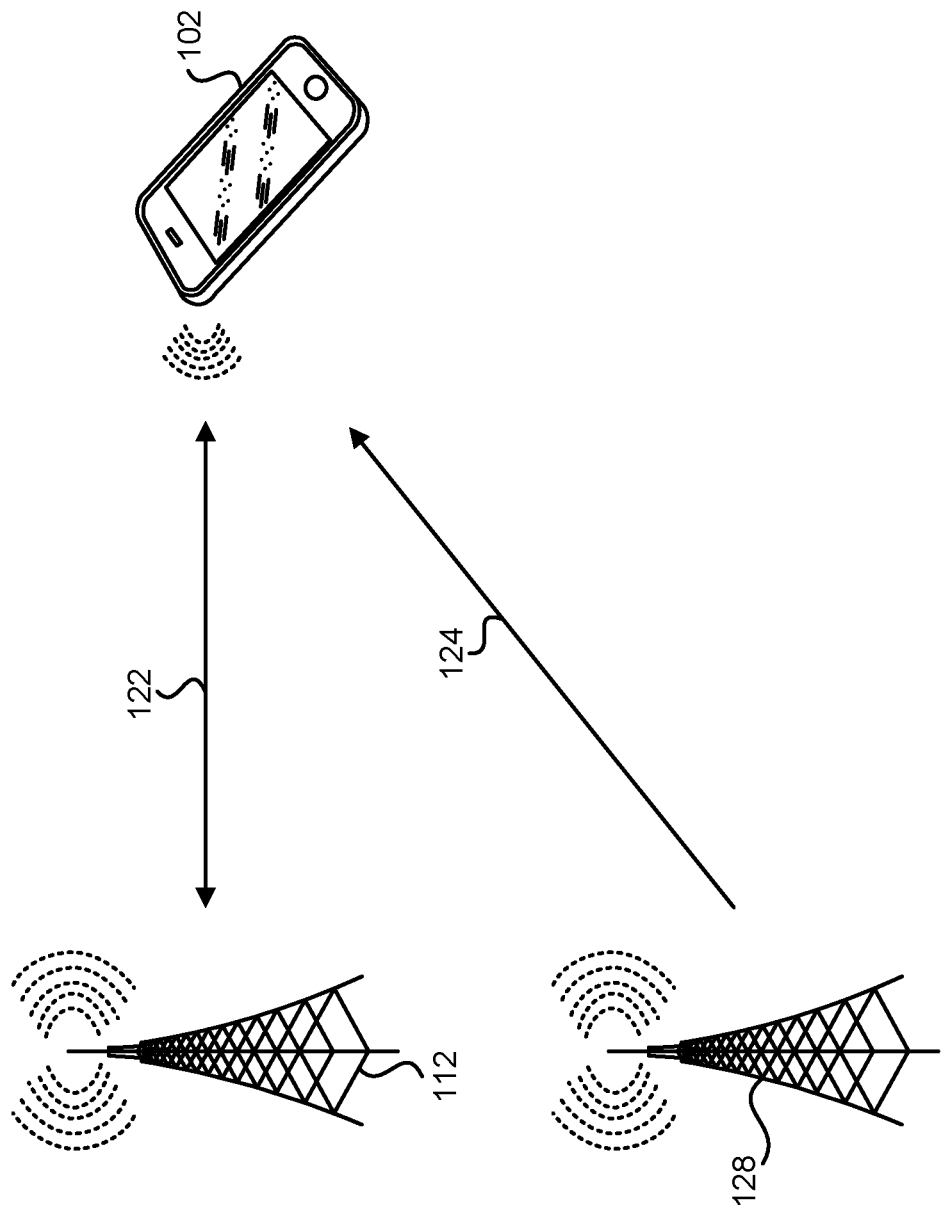
FIG. 1 is a diagram illustrating an example of a wireless communication device in which examples of one or more non-serving cell states may be utilized.

Some examples of the systems and methods disclosed herein relate to non-serving cell states. For instance, some of the techniques described herein may provide one or more transmission configuration indicator (TCI) states associated with one or more non-serving cells. Some of the techniques described herein may provide rules for one or more TCI states associated with one or more non-serving cells (e.g., non-serving cell reference signals (RSs)).

Associating a TCI state with a non-serving cell (e.g., a reference signal of the non-serving cell) may enable usage of layer one (L1) based measurement and reports for non-serving cells, in addition to their usage for serving cells. Associating a TCI state with a non-serving cell may also enable fast handover data or control channels to TCI states of other (e.g., non-serving) cells. Finally, associating a TCI state with a non-serving cell may enable enhanced measurements of other (e.g., non-serving) cell beams, by associating aperiodic channel state information reference signals (AP-CSI-RSs) or tracking reference signals (TRSs) to the TCIs of the other cell(s).

A wireless communication device is an electronic device that may communicate with another device or devices using radio frequency (RF) signals. Examples of the wireless communication devices include smartphones, tablet devices, laptop computers, mobile devices, vehicles, autonomous vehicles, user equipments (UEs), telematics units, embedded devices, etc. A base station is an electronic device that may communicate with one or more wireless communication devices. In some examples, a base station may provide wireless communication devices with access to a network (e.g., cellular network, local area network (LAN), wide area network (WAN), the Internet, etc.). In some examples, a wireless communication device (e.g., UE, embedded device, telematics unit, mobile device, etc.) and/or base station (e.g., Node B, evolved Node B (eNB), g Node B (gNB), etc.) may execute and/or utilize various radio technologies like Global System for Mobile Communication (GSM), third-generation wireless (3G) (e.g., Universal Mobile Telecommunications System (UMTS), Code Division Multiple Access 2000 (CDMA2000), Wideband Code Division Multiple Access (WCDMA), etc.), fourth-generation wireless (4G) (e.g., Long Term Evolution (LTE), etc.), and/or fifth-generation wireless (5G) (e.g., New Radio (NR), etc.).

As used herein, a cell may refer to a wireless communication resource. For example, a cell may refer to a geographic region in which one or more time, frequency, and/or spatial resources may be utilized to communicate wirelessly. A base station may correspond to and/or provide one or more cells. A serving cell may be a cell for communicating payload data (e.g., uplink and/or downlink data) with a wireless communication device. In some examples, a serving cell may be a cell that is in a connected mode (e.g., RRC_Connected mode) or idle mode (e.g., RRC_Idle) with a wireless communication device. For instance, a wireless communication device may monitor one or more channels (e.g., physical downlink control channel (PDCCH) and/or physical downlink shared channel (PDSCH)) of a serving cell for payload data. A non-serving cell may be cell that is not configured to communicate payload data with a wireless communication device. In some examples, a wireless communication device (e.g., UE) may be configured with a list of one or more non-serving cells to monitor. For instance, one or more non-serving cells may be candidate(s) to become a next serving cell when the wireless communication device moves out of coverage of the current serving cell.

Some of the configurations described herein may enable layer 1 (L1) and/or layer 2 (L2) inter-cell mobility. For example, inter-cell mobility may refer to a capability of a wireless communication device to move between cells. For instance, a wireless communication device may move between cells, where cell service may be switched or handed off between cells. As used herein, the term "layer" and variations thereof may refer to a protocol layer or layers in some examples. For example, L1 may refer to a physical (PHY) layer of a protocol stack, L2 may refer to a medium access control (MAC) layer of a protocol stack, and/or layer 3 (L3) may refer to a radio resource control (RRC) layer of a protocol stack. In some examples, one or more other layers may be included in L1, L2, and/or L3. For instance, L2 may include radio link control (RLC) protocol, packet data convergence protocol (PDCP), and/or MAC protocol.

In some approaches, inter-cell mobility is handled at L3 (e.g., an RRC layer). Enabling inter-cell mobility at L1 and/or L2 may improve inter-cell mobility performance. For instance, handling inter-cell mobility at L1 and/or L2 may enable handover to be completed more quickly (e.g., with less latency and/or delay).

A TCI state may be a set of information that may be utilized for performing communication with one or more cells. In some examples, a TCI state may include reference signal (RS) information (e.g., a reference signal measurement, a reference signal indicator, etc.). A reference signal may be a signal sent from a base station. Examples of reference signals may include a channel state information reference signal (CSI-RS), a tracking reference signal (TRS), and/or a synchronization signal block (SSB), etc. In some examples, a reference signal may be utilized to determine one or more parameters for communication. For instance, a reference signal may be utilized to determine an RSS, a channel quality indicator (CQI), precoding matrix indicator (PMI), and/or rank indicator (RI) for reporting to a base station. The RSS, CQI, PMI, and/or RI may be utilized to determine one or more aspects for a communication link (e.g., transmit power, precoding, and/or number of antennas utilized, etc.).

In some approaches, a TCI state may only be associated with one or more serving cell beams and/or serving cell reference signals. In some examples of the techniques described herein, one or more non-serving cell reference signals may be associated with one or more TCI states for measurement and/or reporting of one or more non-serving cells. One or more benefits may be achieved by associating a TCI state with one or more non-serving cell reference signals. In some examples, associating a TCI state with one or more non-serving cell reference signals may enable L1-based measurement and/or reporting for non-serving cells. In some examples, associating a TCI state with one or more non-serving cell reference signals may enable supporting handover data (e.g., fast handover data) and/or one or more control channels for non-serving cell(s) (e.g., other cell beam(s)) in one or more TCI states. In some examples, enhanced measurement of one or more non-serving cell beams may be supported by associating the reference signal(s) (e.g., aperiodic CSI-RS (AP-CSI-RS), TRS, etc.) with one or more TCI state(s).

In some examples, a TCI state may be structured to support association with one or more non-serving cell reference signals. For instance, TCI state content may be modified to include information for one or more non-serving cell reference signals. In some examples, procedures may be modified for activating and/or updating one or more TCI states associated with one or more non-serving cell reference signals. For instance, application time(s) may be established for the activation and/or update of TCI state(s) of non-serving cell reference signal(s).

Various configurations are now described with reference to the Figures, where like reference numbers may or may not indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Introduction to Wireless Communication Networks

FIG. 1 is a diagram illustrating an example of a wireless communication device 102 in which examples of one or more non-serving cell states may be utilized. The wireless communication device 102 may be an example of the wireless communication device 202 described in relation to FIG. 2. A first base station 112 is also illustrated in FIG. 1. The first base station 112 may be a radio access network (RAN) or may be included in a RAN. In some examples, the first base station 112 may be an example of the base station 226 described in relation to FIG. 2. A second base station 128 is also illustrated. In this example, the wireless communication device 102 communicates with the first base station 112. For instance, the first base station 112 sends one or more signals to the wireless communication device 102 over a first channel 122. In some examples, the first base station 112 may provide a serving cell. For instance, the wireless communication device 102 may communicate payload data with (e.g., send payload data to and/or receive payload data from) the first base station 112. In some examples, the wireless communication device 102 may be in a connected mode with the first base station 112.

In some examples, the first base station 112 may send a message indicating a TCI state to the wireless communication device 102. For instance, the first base station 112 may send a message to the wireless communication device 102 to configure one or more TCI states. In some approaches, the message may be a TCI state information element (IE). In some examples, the message may include and/or indicate a non-serving cell identifier. The non-serving cell identifier may be information that identifies a non-serving cell and/or that enables identification of a non-serving cell. In some examples, the first base station 112 may send a reference signal (e.g., a serving cell reference signal).

In some examples, the second base station 128 may send one or more reference signals to the wireless communication device 102. For instance, the second base station 128 may send one or more non-serving cell reference signals to the wireless communication device 102 via a second channel 124.

In some examples, the wireless communication device 102 may determine the TCI state based on the message and the received reference signal from the second base station 128 (e.g., non-serving cell). The wireless communication device 102 may utilize the received reference signal to determine one or more values of the TCI state. For instance, the wireless communication device 102 may set one or more values of the TCI state based on the received reference signal from the non-serving cell. Examples of one or more values of a TCI state may include a CSI-RS value (e.g., non-zero power CSI-RS (NZP-CSI-RS-ResourceId)), SSB value (e.g., SSB-Index), etc. In some cases, the TCI state may be utilized for reporting and/or handover. For instance, the wireless communication device 102 may report one or more parameters (e.g., RSS, CQI, PMI, RI, etc.) to the first base station 112 based on the non-serving cell reference signal and/or may be handed over to the second base station 128, which may switch to providing the serving cell for the wireless communication device 102.

Figure 2:
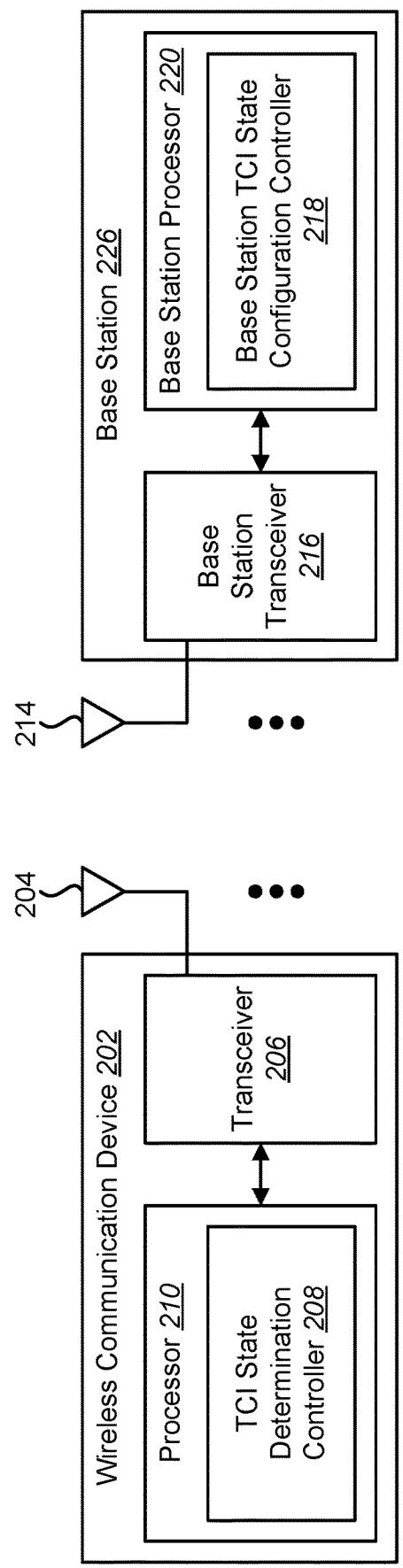
FIG. 2 is a block diagram illustrating an example of a wireless communication device and an example of a base station in which techniques for one or more non-serving cell states may be implemented.

FIG. 2 is a block diagram illustrating an example of a wireless communication device 202 and an example of a base station 226 in which techniques for one or more non-serving cell states may be implemented. The wireless communication device 202 is a device or apparatus for transmitting and/or receiving RF signals. Examples of the wireless communication device 202 include UEs, smartphones, tablet devices, computing devices, computers (e.g., desktop computers, laptop computers, etc.), televisions, cameras, virtual reality devices (e.g., headsets), telematics units, embedded devices (e.g., telematics unit embedded in a vehicle), vehicles (e.g., semi-autonomous vehicles, autonomous vehicles, etc.), robots, aircraft, drones, unmanned aerial vehicles (UAVs), healthcare equipment, gaming consoles, Internet of Things (IoT) devices, etc. The wireless communication device 202 includes one or more components or elements. One or more of the components or elements (e.g., TCI state determination controller 208) may be implemented in hardware (e.g., circuitry) or a combination of hardware and instructions (e.g., a processor with software and/or firmware stored in memory).

In some examples, the wireless communication device 202 includes one or more antennas 204, a transceiver 206, and/or a processor 210. In some examples, the wireless communication device 202 includes one or more components and/or elements that are not shown in FIG. 2. For example, the wireless communication device 202 may include an RF front end (RFE), switch(es), filter(s), power amplifier(s), downconverter(s), upconverter(s), memory, and/or display (e.g., touchscreen), etc.

The transceiver 206 may be configured to send one or more signals to one or more other devices (e.g., base station 226) and/or to receive one or more signals from one or more other devices (e.g., base station 226, other base station(s), serving cell(s), and/or non-serving cell(s), etc.). For example, a base station 226 may utilize one or more antennas 214 to transmit one or more signals to the wireless communication device 202 and/or to receive one or more signals from the wireless communication device 202. The transceiver 206 may include a transmitter (to send signal(s), for example) and/or a receiver (to receive signal(s), for example). In some examples, the transceiver 206 may be coupled to the antenna(s) 204 for transmitting and/or receiving signals. The transceiver 206 may be circuitry configured to perform one or more functions. For example, the transceiver 206 may include one or more integrated circuits with circuit components (e.g., transistors, resistors, capacitors, etc.). For instance, the transceiver 206 may include one or more power amplifiers, switches (for antenna port switching, for instance), filters, low-noise amplifiers, etc. The antenna(s) 204 may radiate one or more signals (e.g., electromagnetic signals, RF signals, wireless signals, etc.) provided by the transceiver 206. In some examples, the antenna(s) 204 may be utilized to receive one or more signals (e.g., message(s) indicating TCI state(s), configuration signals, etc.) from another device or devices (e.g., base station 226). For instance, the antenna(s) 204 may provide received signals to the transceiver 206 of the wireless communication device 202.

The processor 210 may be hardware (e.g., circuitry, transistors, etc.) for performing one or more operations. In some examples, the processor 210 may be one or more modems (e.g., modem processors) for performing operations (e.g., modulation, encoding, precoding, formatting, demodulation, decoding, etc.). For instance, the processor 210 may perform one or more operations on one or more signals and provide the signal(s) to the transceiver 206 for transmission. In some examples, the processor 210 may control one or more aspects of transceiver 206 operation. For instance, the processor 210 may control antenna port switching, antenna weighting (e.g., phase weighting and/or gain weighting), etc., to enable transmission and/or reception on one or more carriers, beams, streams, and/or multiple input multiple output (MIMO) layers. In some examples, the processor 210 may perform one or more operations on received signals from a receiver. For instance, the processor 210 may perform demodulation, detection, decoding, etc., and/or may convert the signal(s) or portions of the signal(s) into data (e.g., bits).

In some examples, the processor 210 executes instructions to perform one or more functions. In some examples, the processor 210 includes one or more functionalities that are structurally implemented as hardware (e.g., circuitry). In some examples, the processor 210 includes a baseband processor, a modem processor, an application processor, and/or any combination thereof. In some examples, the wireless communication device 202 and/or the processor 210 may be configured to perform one or more of the methods 300, 700 and/or one or more portions of method(s), function(s), and/or operation(s) described in relation to one or more of the Figures. In some examples, the wireless communication device 202 and/or processor 210 includes one or more of the components and/or elements described in relation to one or more of the Figures.

The base station 226 is a device or apparatus for transmitting and/or receiving RF signals. Examples of the base station 226 include Node Bs, eNBs, gNBs, cellular towers, access points, gateways, wireless routers, etc. The base station 226 includes one or more components or elements. One or more of the components or elements (e.g., base station TCI state configuration controller 218) may be implemented in hardware (e.g., circuitry) or a combination of hardware and instructions (e.g., a processor with software and/or firmware stored in memory).

In some examples, the base station 226 includes one or more antennas 214, a base station transceiver 216, and/or a base station processor 220. In some examples, the base station 226 includes one or more components and/or elements that are not shown in FIG. 2. For example, the base station 226 may include an RF front end (RFE), switch(es), filter(s), power amplifier(s), downconverter(s), upconverter(s), memory, and/or display, etc.

The base station transceiver 216 may be configured to send one or more signals to one or more other devices (e.g., wireless communication device 202 and/or one or more other wireless communication devices) and/or to receive one or more signals from one or more other devices (e.g., wireless communication device 202 and/or one or more other wireless communication devices). For example, a base station 226 may utilize one or more antennas 214 to transmit one or more signals to the wireless communication device 202 and/or to receive one or more signals from the wireless communication device 202. The base station transceiver 216 may include a transmitter (to send signal(s), for example) and/or a receiver (to receive signal(s), for example). In some examples, the base station transceiver 216 may be coupled to the antennas 214 for transmitting and/or receiving signals. The base station transceiver 216 may be circuitry configured to perform one or more functions. For example, the base station transceiver 216 may include one or more integrated circuits with circuit components (e.g., transistors, resistors, capacitors, etc.). For instance, the base station transceiver 216 may include one or more power amplifiers, switches (for antenna port switching, for instance), filters, low-noise amplifiers, etc. The antenna(s) 214 may radiate one or more signals (e.g., electromagnetic signals, RF signals, wireless signals, reference signal(s), message(s) indicating TCI state(s), etc.) provided by the base station transceiver 216. In some examples, the antenna(s) 214 may be utilized to receive one or more signals (e.g., RSS, CQI, RI, PMI, etc.) from another device or devices (e.g., wireless communication device 202). For instance, the antenna(s) 214 may provide received signals to the base station transceiver 216 of the base station 226.

The base station processor 220 may be hardware (e.g., circuitry, transistors, etc.) for performing one or more operations. In some examples, the base station processor 220 may be one or more modems (e.g., modem processors) for performing operations (e.g., modulation, encoding, precoding, formatting, demodulation, decoding, etc.). For instance, the base station processor 220 may perform one or more operations on one or more signals and provide the signal(s) to the base station transceiver 216 for transmission. In some examples, the base station processor 220 may control one or more aspects of base station transceiver 216 operation. For instance, the base station processor 220 may control antenna port switching, antenna weighting (e.g., phase weighting and/or gain weighting), etc., to enable transmission and/or reception on one or more carriers, beams, streams, and/or MIMO layers. In some examples, the base station processor 220 may perform one or more operations on received signals from a receiver. For instance, the base station processor 220 may perform demodulation, detection, decoding, etc., and/or may convert the signal(s) or portions of the signal(s) into data (e.g., bits).

In some examples, the base station processor 220 executes instructions to perform one or more functions. In some examples, the base station processor 220 includes one or more functionalities that are structurally implemented as hardware (e.g., circuitry). In some examples, the base station processor 220 includes a baseband processor, a modem processor, an application processor, and/or any combination thereof. In some examples, the base station 226 and/or the base station processor 220 may be configured to perform one or more of the methods 400, 800 and/or one or more portions of method(s), function(s), and/or operation(s) described in relation to one or more of the Figures. In some examples, the base station 226 and/or base station processor 220 includes one or more of the components and/or elements described in relation to one or more of the Figures.

In some examples, the wireless communication device 202, processor 210, transceiver 206, base station 226, base station processor 220, and/or base station transceiver 216 may implement one or more aspects of one or more specifications (e.g., 3rd Generation Partnership Project (3GPP) Release 25, 3GPP Release 26, fifth generation (5G), New Radio (NR), and/or Long-Term Evolution (LTE), etc.). In some examples, the wireless communication device 202 transmits signals to one or more base stations (e.g., base station 226) and/or receives signals from one or more base stations (e.g., base station 226). For instance, the wireless communication device 202 may transmit signals to and/or may receive signals from one or more RANs, eNBs, gNBs, cellular networks, etc. In some examples, the wireless communication device 202 also communicates with one or more radio access technologies (RATs) (e.g., cellular network, wireless local area network (WLAN), Wi-Fi network, personal area network (PAN), and/or Bluetooth, etc.).

In some examples, the base station 226 (e.g., base station processor 220 and/or base station TCI state configuration controller 218) may be configured to determine a configuration for one or more TCI states. For instance, the base station 226 may determine one or more cells (e.g., serving cell(s) and/or non-serving cell(s)) for the wireless communication device 202 to monitor, one or more non-serving cell identifiers, one or more resources (e.g., time and/or frequency resources, such as a bandwidth part (BWP), for non-serving cell monitoring), quasi-colocation (QCL) type(s) (e.g., typeA, typeB, typeC, typeD, etc.) corresponding to one or more non-serving cells, etc. A QCL type may indicate a relationship between the TCI state and a reference signal. For instance, QCL typeA may indicate shared factors (e.g., Doppler shift, Doppler spread, delay, and/or delay spread) between a reference signal and the TCI state. Other QCL types may indicate fewer shared factors (e.g., typeB may indicate shared Doppler shift and Doppler spread, typeC may indicate shared delay and Doppler shift, and/or typeD may indicate a shared angle of reception and/or spatial filter). For instance, a QCL type may indicate a relationship between a non-serving cell reference signal and the associated TCI state.

In some examples, the base station 226 may determine the configuration for the TCI state based on one or more communications with and/or data about one or more base stations (e.g., nearby base station(s), neighboring base station(s), etc.). For instance, the base station 226 may communicate with one or more other base stations (not shown in FIG. 2) to determine resources (e.g., time and/or frequency resources, BWP, etc.) on which other base station(s) send reference signal(s). In some examples, the base station 226 may communicate with the base station(s) using one or more wired and/or wireless links (e.g., backhaul link(s)). In some approaches, the base station 226 may communicate with one or more other base stations to determine one or more non-serving cell identifiers for monitoring. In some examples, information for determining a configuration for a TCI state may be previously stored and/or based on input received from a user.

In some examples, the base station 226 may include a transmitter configured to send a message indicating a TCI state. For instance, the base station 226 may send a message to the wireless communication device 202 indicating the determined configuration for the TCI state. The message may be used (by the wireless communication device 202, for instance) to determine the TCI state based on one or more non-serving cell identifiers and one or more reference signals from one or more non-serving cells. In some examples, the base station 226 may provide a serving cell for the wireless communication device 202 and/or a non-serving cell for the wireless communication device 202 and/or one or more other wireless communication devices (not shown in FIG. 2). In some examples, another base station (not shown in FIG. 2) may provide a non-serving cell and/or a serving cell for the wireless communication device 202.

In some examples, the wireless communication device 202 may include a receiver configured to receive a message indicating a TCI state. For instance, the transceiver 206 may receive the message indicating the TCI state. The wireless communication device 202 (e.g., processor 210 and/or TCI state determination controller 208) may be configured to determine the TCI state based on the message, one or more non-serving cell identifiers, and/or one or more received reference signals from a non-serving cell. For example, the wireless communication device 202 may utilize the received message to identify and/or monitor one or more non-serving cells. In some examples, the non-serving cell identifier(s) may be included in the message and/or the message may indicate one or more non-serving cells for monitoring (e.g., an indicator of and/or a list of non-serving cells). The wireless communication device 202 (e.g., antenna(s) 204 and/or transceiver 206) may monitor for and/or receive one or more reference signals (e.g., CSI-RS(s), TRS(s), and/or SSB(s), etc.) from one or more non-serving cells indicated by one or more non-serving cell identifiers. In some examples, the received reference signal(s) may be one or more CSI-RSs, one or more SSBs, and/or one or more TRSs, etc. In some examples, one or more received reference signals from one or more non-serving cells may be one or more source reference signals to determine and/or define QCL information (e.g., QCL-info) of the TCI state(s). For instance, a source reference signal may be a reference signal that is used to define QCL information of a TCI state. In some examples, determining the TCI state may include determining and/or defining QCL information for the TCI state based on a received reference signal (from a non-serving cell, for instance). A reference signal (e.g., source reference signal) may be represented as a property of a TCI state. For instance, a TCI state may include a property "referenceSignal," which may be utilized to represent the received reference signal (e.g., a source reference signal).

In some approaches, a TCI state information element is limited to a source reference signal only from the same serving cell. In some examples of the techniques described herein, to allow a TCI state to be associated with one or more non-serving cell reference signals, a TCI state (e.g., TCI state information element) may include one or more non-serving cell identifiers. For instance, the TCI state may include one or more non-serving cell identifiers.

In some examples, a TCI state information element may include serving cell and/or non-serving cell identifier information. For instance, a TCI state may include QCL information. In some approaches, QCL information of a TCI state corresponds to non-serving cell information without serving cell information. For instance, all QCL information in a TCI state information element may all use reference signals from the same non-serving cell.

In some approaches, QCL information of a TCI state corresponds to one or more non-serving cell identifiers. For instance, a TCI state may include QCL information corresponding to non-serving cell identifier(s) non-exclusively (e.g., may also include QCL information corresponding to serving cell identifier(s)). In some examples, a non-serving cell identifier information may be included in QCL information (e.g., each QCL-Info). In some approaches, a non-serving cell identifier may be a property of the QCL information. For instance, a non-serving cell identifier property may be included inside QCL information (e.g., a QCL-Info parameter). In some approaches, a non-serving cell identifier is a property of a reference signal property (e.g., "referenceSignal") of QCL information (e.g., in a QCL-Info property or parameter). For example, a QCL-Info parameter may include a cell property, a BWP identifier property, a reference signal property, and/or a QCL type property. The reference signal property may include a CSI-RS property and/or an SSB property. A non-serving cell identifier may be included with a CSI-RS (e.g., CSI-RS property) and/or SSB (e.g., SSB property) (as a property of the reference signal property, for instance). In some approaches, a QCL type of the QCL information indicates that a received reference signal corresponds to a non-serving cell. For instance, a QCL type (e.g., typeE) may be utilized to indicate that the reference signal is from a non-serving cell.

Listing (1) is an example of a TCI state information element. In some of the approaches described herein, one or more non-serving cell identifiers may be incorporated into a TCI state information element as one or more properties and/or sub-properties. For instance, a non-serving cell identifier property (and/or property of a property) may be added to the TCI state and/or may replace a property (and/or property of a property) of the example of the TCI state illustrated in Listing (1).

Listing (1)

```
-- ANS1START
-- TAG-TCI-STATE-START
TCI-State ::=      SEQUENCE {
   tci-StateId        TCI-StateId,
   qcl-Type1          QCL-Info,
   qcl-Type2          QCL-Info         OPTIONAL, -- Need R
   ...
}
QCL-Info ::=       SEQUENCE {
   cell               ServCellIndex    OPTIONAL, -- Need R
   bwp-Id             BWP-Id           OPTIONAL - Cond CSI-RS-Indicated
   referenceSignal    CHOICE {
      csi-rs             NZP-CSI-RS-ResourceId,
      ssb                SSB-Index
   },
   qcl-Type           ENUMERATED {typeA, typeB, typeC, typeD},
   ...
}
-- TAG-TCI-STATE-STOP
-- ASN1STOP
```

Example Non-Serving Cell States

In some examples, the wireless communication device 202 (e.g., transceiver 206, transmitter, etc.) may be configured to transmit a capability report indicating a TCI state capability. In some examples, the base station 226 (e.g., base station transceiver 216, receiver, etc.) may be configured to receive a capability report indicating a TCI state capability. A TCI state capability may be information indicating one or more capabilities of the wireless communication device 202 to handle one or more TCI states associated with one or more non-serving cells. For instance, the wireless communication device 202 may have a capability to manage (e.g., monitor, maintain, record, report, etc.) one or more TCI states for one or more non-serving cells. In some examples, a capability may be expressed as a class, where each class may establish a minimum number and/or maximum number for one or more capabilities that the class supports. In some examples, the wireless communication device 202 (e.g., UE) may report the capability(ies) to the base station 226 (e.g., gNB).

In some examples, the TCI state capability may indicate a maximum number of TCI states for serving cells and non-serving cells. For instance, the wireless communication device 202 may report a maximum number of TCI states including any TCI state(s) for serving cell(s) and for non-serving cell(s).

In some examples, the wireless communication device 202 may report a TCI state capability of non-serving cells. For example, the TCI state capability may indicate a maximum number of TCI states for non-serving cells. For instance, the TCI state capability may indicate a maximum total number of TCI states for all non-serving cell(s). In one example, the wireless communication device 202 may be capable of supporting up to 64 TCI states total for all non-serving cells.

In some examples, the TCI state capability may indicate a maximum number of TCI states per non-serving cell. For instance, the TCI state capability may indicate a maximum number of TCI states per non-serving cell. In one example, the wireless communication device 202 may be capable of supporting up to 8 TCI states per non-serving cell.

In some examples, the TCI state capability may indicate a maximum number of non-serving cells with reference signals configured for TCI state association. The non-serving cells may be identified, for example, by their physical cell IDs (PCIs). Thus, the TCI state capability may indicate a maximum number of PCIs, different from the serving cell PCI, that are associated with activated TCI states. For instance, the TCI state capability may indicate a maximum number of non-serving cells with corresponding reference signals that are configured for a TCI state. In one example, the wireless communication device 202 may be capable of supporting up to 8 non-serving cells with reference signals for one or more TCI states. In another example, the wireless communication device 202 may be capable of supporting one PCI, different from the serving cell PCI, with corresponding reference signals that are configured for an activated TCI state.

In some examples, separate numbering spaces (e.g., different numerical ranges) may be utilized for one or more TCI states associated with serving cell reference signal(s) and for TCI states associated with non-serving cell reference signal(s). For instance, each TCI state may have an associated TCI state identifier. A first TCI state identifier numbering space for serving cells may be separate from a second TCI state identifier numbering space for non-serving cells. In some approaches, a TCI state associated with non-serving cell reference signal(s) may follow different update and/or activation rules, and/or may be subject to different capability constraints. The TCI state(s) associated with non-serving cell reference signal(s) may be numbered using a separate TCI state identifier space from TCI state(s) of serving cell reference signal(s). For example, a TCI state of a serving cell reference signal may be numbered with a TCI state identifier in a range of 0-63, and a TCI state of a non-serving cell may be numbered with a TCI state identifier in a range of 64-127.

In some examples, a TCI state identifier numbering space may be shared for one or more serving cells and/or one or more non-serving cells. For instance, all TCI state identifiers may share the same numbering space.

In some examples, one or more restrictions may be imposed on reference signals for monitoring (e.g., source reference signals). For instance, the wireless communication device 202 may monitor a limited and/or restricted set of reference signals. In some examples, a monitoring set of reference signals may be a set of reference signals that may be used to determine a TCI state. For instance, only a reference signal or reference signals in the monitoring set of reference signals may be used as a source reference(s) of the TCI state. For example, a monitoring set of reference signals corresponding to one or more non-serving cells may be based on a frequency range of serving cell reference signal(s) and/or a wireless communication device capability. In some approaches, one or more restrictions may be utilized based on BWP and/or frequency locations of the non-serving cell reference signal(s). For example, based on wireless communication device 202 (e.g., UE) capability, reference signals within a same frequency range (e.g., BWP and/or frequency location(s)) of serving cell reference signal(s) may be used as non-serving cell reference signal(s). Intra-frequency monitoring for non-serving cells may refer to a monitoring set of one or more non-serving cell reference signals that are included within a frequency range (e.g., BWP) that includes one or more serving cell reference signals.

In some examples, the monitoring set of reference signals corresponding to one or more non-serving cells may include one or more reference signals that are outside of (e.g., not included within) a frequency range that includes one or more serving cell reference signals. Inter-frequency monitoring for non-serving cells may refer to a monitoring set of one or more non-serving cell reference signals that outside of a frequency range (e.g., BWP) that includes one or more serving cell reference signals. In some examples, intra-frequency monitoring may be supported by a lower wireless communication device capability class than a wireless communication device capability class that supports inter-frequency monitoring.

In some examples, a monitoring set of reference signals for sub-layer 3 mobility corresponding to one or more non-serving cells may be based on a received set of reference signal identifiers. For instance, the base station 226 may send, and/or the wireless communication device 202 may receive, a set of reference signal identifiers. The set of reference signal identifiers may be sent in a message for layer 3 (L3) monitoring, but may be refashioned for sub-layer 3 (e.g., L1 and/or L2) mobility. In some approaches, a wireless communication device may monitor other cells' reference signals. For instance, an information element (e.g., MeasObjectNR) may indicate configurations of other cells' reference signal measurement. An information element (e.g., ReferenceSignalConfig) may provide a list of SSBs and/or CSI-RSs that a wireless communication device may measure. In some examples of the techniques described herein, not all non-serving cell reference signals may be configured as a source reference for a TCI state. For instance, qualified non-serving cell reference signals may include the non-serving cell reference signals configured in a monitoring set of reference signals (e.g., list). An example of the monitoring set of reference signals may include the information element ReferenceSignalConfig from the serving cell (e.g., base station 226). In an example, assume that a serving cell is cell0, and SSB1 of cell2 is configured in the list in ReferenceSignalConfig. SSB1 of cell2 may be used as a source reference signal for the TCI state in cell0. For example, a TCI state associated with a non-serving cell, TCI1, may be defined using SSB1 of cell2 as a source reference signal.

In some examples, the monitoring set of reference signals corresponding to one or more non-serving cells may be based on a serving cell TCI state. For instance, the monitoring set of reference signals may include one or more non-serving cell reference signals that is or are target reference signals of the serving cell TCI state. A target reference signal may be a reference signal corresponding to a non-serving cell that is targeted for potential handover. In an example, in cell0, a CSI-RS0 may be defined using TCI1 (e.g., CSI-RS0 may be a target reference signal of TCI1). Accordingly, CSI-RS0 may be used as a source reference signal of a TCI state associated with a non-serving cell.

In some examples, the wireless communication device 202 (e.g., processor 210 and/or TCI state determination controller 208, etc.) may be configured to select a reference signal (e.g., a source reference signal) from a qualified set of reference signals. For instance, the source reference signal of TCI state associated with a non-serving cell may only be selected from the qualified set of reference signals in some approaches. A qualified set of reference signals may be a set of reference signals from which a source reference signal may be selected. In some cases, the qualified set of reference signals may be different from, similar to, or the same as the monitored set of reference signals. For example, there may be cases in which the wireless communication device 202 may monitor one or more inter-frequency reference signals (e.g., a set of reference signals that includes one or more reference signals outside of a frequency range of one or more serving cell reference signals), while only an intra-frequency reference signal (e.g., a reference signal that is within a frequency range of one or more serving cell reference signals) may be selected and/or used as a source reference signal.

In some examples, the wireless communication device 202 (e.g., processor 210 and/or TCI state determination controller 208, etc.) may be configured to determine the qualified set of reference signals. In some approaches, the wireless communication device 202 (e.g., processor 210 and/or TCI state determination controller 208, etc.) may be configured to determine the qualified set of reference signals based on the monitoring set of reference signals. For instance, the qualified set of reference signals may be the monitored set of reference signals, which may be determined as described above.

In some approaches, the wireless communication device 202 (e.g., processor 210 and/or TCI state determination controller 208, etc.) may be configured to determine the qualified set of reference signals based on a frequency range of serving cell reference signals and/or a wireless communication device capability. For instance, the qualified set may be restricted based on BWP and/or frequency locations of the non-serving cell reference signal(s). For example, based on wireless communication device 202 (e.g., UE) capability, reference signals within a same frequency range (e.g., BWP and/or frequency location(s)) of serving cell reference signal(s) may be used as qualified non-serving cell reference signal(s). The qualified set of reference signals (e.g., one or more non-serving cell reference signals) may be determined as non-serving cell reference signals (e.g., intra-frequency reference signals) that are included within a frequency range (e.g., BWP) that includes one or more serving cell reference signals.

In some examples, the qualified set of reference signals may be determined to include one or more one or more non-serving cell reference signals (e.g., inter-frequency reference signals) that are outside of (e.g., not included within) a frequency range that includes one or more serving cell reference signals. The qualified set of reference signals may include inter-frequency reference signal(s) and/or intra-frequency reference signal(s) corresponding to one or more non-serving cells. In some examples, the qualified set of reference signals may include one or more non-serving cell reference signals that are outside of a frequency range (e.g., BWP) that includes one or more serving cell reference signals. In some examples, a qualified set of intra-frequency reference signal(s) may be supported by a lower wireless communication device capability class than a wireless communication device capability class that supports a qualified set of inter-frequency reference signal(s) (with or without intra-frequency reference signal(s), for instance).

In some examples, a qualified set of reference signals for sub-layer 3 mobility corresponding to one or more non-serving cells may be determined based on a received set of reference signal identifiers. For instance, the base station 226 may send, and/or the wireless communication device 202 may receive, a set of reference signal identifiers. The set of reference signal identifiers may be sent in a message for layer 3 (L3) monitoring, but may be refashioned for sub-layer 3 (e.g., L1 and/or L2) mobility. For instance, the qualified set of reference signals may be determined based on (e.g., selected from) one or more information elements (e.g., MeasObjectNR and/or ReferenceSignalConfig) that may indicate configurations of other cells' reference signal measurement and/or that may provide a list of SSBs and/or CSI-RSs that a wireless communication device may measure. For instance, qualified non-serving cell reference signals may include the non-serving cell reference signals configured by an information element (e.g., list). An example of the qualified set of reference signals may include the information element ReferenceSignalConfig from the serving cell (e.g., base station 226).

In some examples, the wireless communication device 202 (e.g., processor 210 and/or TCI state determination controller 208, etc.) may be configured to determine the qualified set of reference signals (corresponding to one or more non-serving cells, for instance) based on a serving cell TCI state. For instance, the qualified set of reference signals may be determined to include one or more non-serving cell reference signals that is or are target reference signals of the serving cell TCI state. In some examples, the qualified set of reference signals may be determined based on whether the reference signal of the non-serving cell is quasi-colocated to a serving cell TCI state.

As a wireless communication device (e.g., UE) moves, a wireless communication device may use different beams from different base stations (e.g., gNBs). In some examples, a base station and/or wireless communication device may update TCI states accordingly. For TCI states of serving cell reference signals, an RRC configuration of a TCI state may be updated. In some approaches, downlink control information (DCI) may be utilized to update the content of a TCI state. In some approaches, a medium access control (MAC) control element (MAC-CE) may be utilized to activate and/or select TCI states for a PDSCH and/or PDCCH.

In some approaches for updating a TCI state for a non-serving cell, DCI and/or a MAC-CE may be utilized. Using DCI and/or a MAC-CE may reduce latency. As described herein, the base station 226 may send, and/or the wireless communication device 202 may receive, a message indicating a TCI state that may be associated with a non-serving cell. In some examples, the message may be a DCI message (for activating and/or updating a TCI state for one or more non-serving cells). The wireless communication device 202 (e.g., processor 210) may be configured to determine an acknowledgement (ACK) in response to the DCI message. The wireless communication device 202 (e.g., transceiver 206) may send the ACK to the base station 226 in response to the DCI message. For DCI based update and/or activation, for instance, the wireless communication device 202 (e.g., UE) may send an ACK for the DCI to confirm reception.

In some examples, the message may be a MAC-CE message. For instance, the base station 226 may send, and/or the wireless communication device 202 may receive, a MAC-CE message to update and/or activate a TCI state associated with a non-serving cell. In some examples, if MAC-CE and/or DCI-based signaling is not supported for updating and/or activating a TCI state associated with a non-serving cell, then the wireless communication device 202 (e.g., UE) may utilize RRC-based reconfiguration. For instance, the base station 226 may send, and/or the wireless communication device 202 may receive, an RRC message to update and/or activate a TCI state associated with a non-serving cell.

In some examples, updating a TCI state associated with a non-serving cell reference signal may follow one or more procedures. For instance, the message may indicate a switch in reference signal association between reference signals (e.g., between monitored reference signals and/or to a qualified reference signal). The wireless communication device 202 (e.g., processor 210) may be configured to switch a reference signal association between monitored reference signals (e.g., to switch the source reference signal of a TCI state to another reference signal). For example, the message may indicate changing an associated reference signal from RS1 to RS2, where RS1 and RS2 are both configured in the monitored set of reference signals (e.g., a list indicated by ReferenceSignalConfig or ReferenceSignalConfiguration). In some examples, the message may indicate adding a monitored reference signal (and/or qualified reference signal) and switching a reference signal association (e.g., switching a source reference signal) to the added monitored reference signal (and/or qualified reference signal). The wireless communication device 202 (e.g., transceiver 206, receiver, etc.) may be configured to receive signaling (a message sent from a base station, such as base station 226, for example) indicating a reference signal switch (e.g., a switch of the source reference signal). The wireless communication device 202 (e.g., processor 210) may be configured to add a monitored reference signal and switch a reference signal (e.g., switch a source reference signal) association to the added monitored reference signal. For example, the update may include changing the associated reference signal from RS1 to RS2, where RS2 is not in the monitored set of reference signals yet, and the monitored set of reference signals (e.g., MeasObjectNR in RRC) may be updated first to include RS2.

The monitored set of reference signals may include all the reference signals that the base station 226 (e.g., gNB) configures the wireless communication device 202 (e.g., UE) to monitor. In some examples, MAC-CE and/or DCI based-signaling may be utilized to update a non-serving cell reference signal measurement configuration (e.g., the set of monitored reference signals). In some examples, a single message (e.g., update signaling indicated by a MAC-CE message or DCI message) may be utilized to update the set of monitored reference signals (e.g., MeasObject) and to update the TCI state configuration. In some approaches, updating MeasObjectNR is performed via RRC reconfiguration.

In some examples, activation signaling may include one or a combination of DCI, MAC-CE, and/or RRC signaling. In some examples, update signaling may include one or a combination of DCI, MAC-CE, and/or RRC signaling. In some examples, the wireless communication device 202 (e.g., UE) may report a capability of which signaling and/or signaling combination is supported. For DCI and/or MAC-CE-based TCI update and/or activation, the wireless communication device (e.g., UE) may send an ACK for the DCI to the base station 226 (e.g., gNB).

In some examples, the update and/or activation may take effect after an application time. An application time may be a period allocated for a wireless communication device to activate and/or update a configuration (e.g., TCI state configuration). In some examples, an application time is a period from a time of receiving signaling indicating an update to a time when the update takes effect. In some examples, an application time may be a "beam application time" for a wireless communication device to activate and/or update a configuration for a beam or beams.

One or more approaches may be utilized for application time in accordance with the techniques described herein. In some examples, an application time for a non-serving cell beam may be configured by a base station. For instance, a beam application time may be configured by the base station 226 (e.g., gNB) based on a wireless communication device 202 capability. For example, wireless communication device 202 capability may be supported for a minimum value of beam application time.

In some examples, an application time for a non-serving cell beam may be configured by a base station to be greater than or equal to a fixed minimum application time. For instance, a beam application time may be configured by the base station 226 (e.g., gNB), where a minimum value of beam application time is fixed and/or predefined.

In some examples, an application time for a non-serving cell beam is fixed. For instance, a beam application time may be fixed and/or pre-defined.

In some examples, a first application time for a non-serving cell (e.g., non-serving cell beam) may be separate from a second application for a serving cell. For instance, an application time for the wireless communication device 202 to apply an update and/or activation of a TCI state associated with a non-serving cell may be different from an application time for a TCI state associated with a serving cell. In some examples, the wireless communication device 202 (e.g., UE) may report two separate capabilities (e.g., a capability for application time for non-serving cell(s) and a capability for application time for serving cell(s)) to the base station 226. In some examples, the base station 226 (e.g., gNB) may indicate two separate application times (e.g., a first application time for non-serving cell(s) and a second application time for serving cell(s)) to the wireless communication device 202. For instance, an application time for serving cell(s) may be 3 milliseconds (ms), and/or an application time for non-serving cell(s) may be the same amount of time or longer (e.g., a 5 ms fixed time) or may be based on one or more SSB measurement timing configuration(s) (SMTC(s)). Other examples of application times (within a range, such as 0.5 ms to 20 ms, for instance) may be used in some configurations. In some examples, specifications (e.g., 3GPP specifications) may be modified to specify separate values of application times for non-serving cell(s) and serving cell(s). In some examples, application time of a TCI state associated with a non-serving cell may depend on an SMTC. For instance, an application time for non-serving cell(s) may vary with varying SMTCs.

Figure 3:
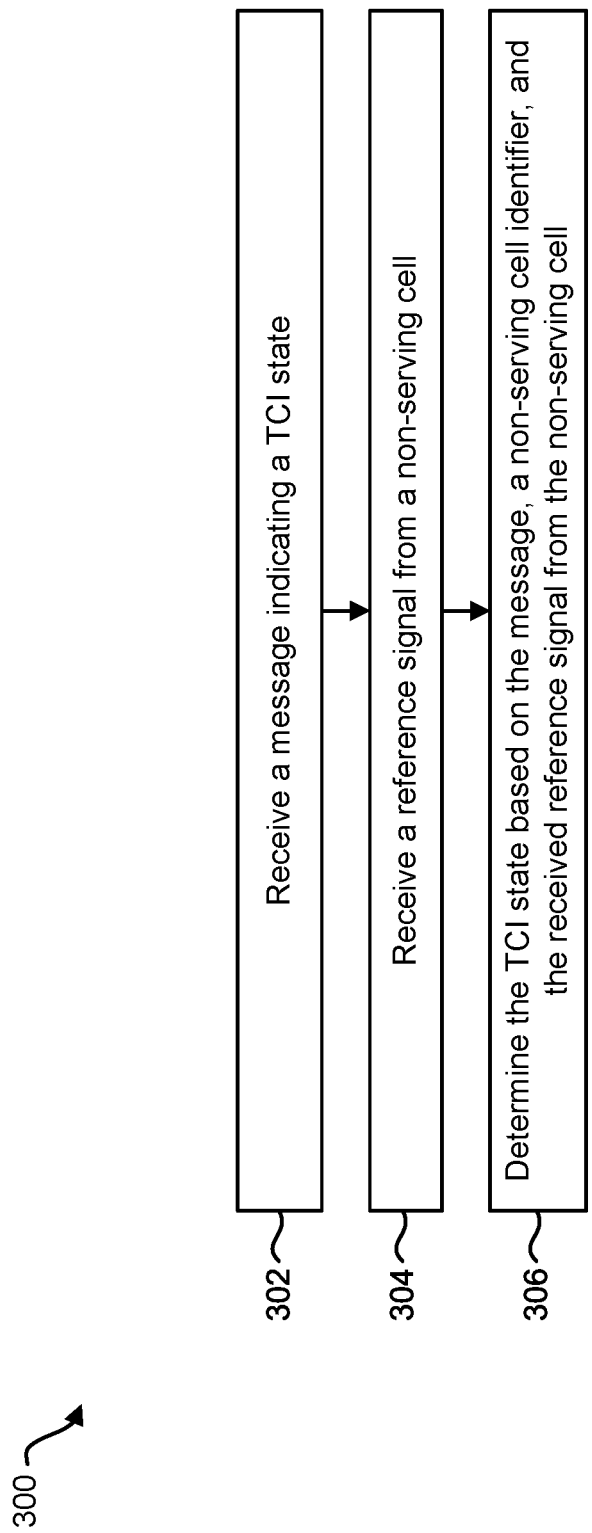
FIG. 3 is a flow diagram illustrating an example of a method for one or more non-serving cell states.

FIG. 3 is a flow diagram illustrating an example of a method 300 for one or more non-serving cell states. In some examples, the method 300 is performed by a wireless communication device (e.g., the wireless communication device 202 described in relation to FIG. 2).

A wireless communication device may receive 302 a message indicating a TCI state. In some examples, receiving 302 the message may be performed as described in relation to FIG. 2. In some examples, the message may indicate one or more non-serving cell identifiers and/or resources to monitor to determine the TCI state.

The wireless communication device may receive 304 a reference signal from a non-serving cell. In some examples, receiving 304 the reference signal may be performed as described in relation to FIG. 2. For instance, the wireless communication device may monitor resources (e.g., time and/or frequency resource(s), BWP(s), etc., which may be indicated by the message indicating the TCI state) to receive 304 one or more reference signals from one or more non-serving cells (e.g., base station(s)).

The wireless communication device may determine 306 the TCI state based on the message, a non-serving cell identifier, and/or the received reference signal from the non-serving cell. In some examples, determining 306 the TCI state may be performed as described in relation to FIG. 2. For instance, the wireless communication device may utilize one or more received reference signals from one or more non-serving cells to determine one or more values (e.g., channel state measurements, channel state information (CSI), SSB, CQI, PMI, and/or RI, etc.). The values may be measured and/or stored to determine the TCI state.

In some examples, the wireless communication device may utilize the TCI state associated with non-serving cell(s) to perform one or more operations. For example, the wireless communication device may report one or more of the values of the TCI state associated with one or more non-serving cells. For instance, the wireless communication device may send and/or indicate one or more values to a base station (e.g., serving cell), where the one or more values are determined from monitoring one or more reference signals from one or more non-serving cells. In some examples, the TCI state associated with one or more non-serving cells may be utilized for one or more mobility (e.g., handover) procedures. For instance, the wireless communication device may select, indicate, and/or communicate with a non-serving cell to transition the non-serving cell to a serving cell for the wireless communication device. For instance, the wireless communication device may select a non-serving cell with best TCI state values for handover. The wireless communication device may send a request to the non-serving cell to connect to (e.g., enter a connected mode) and/or receive service from the non-serving cell. In some examples, one or more of the mobility procedure(s) may be performed at L1 and/or L2 (e.g., sub-L3).

Figure 4:
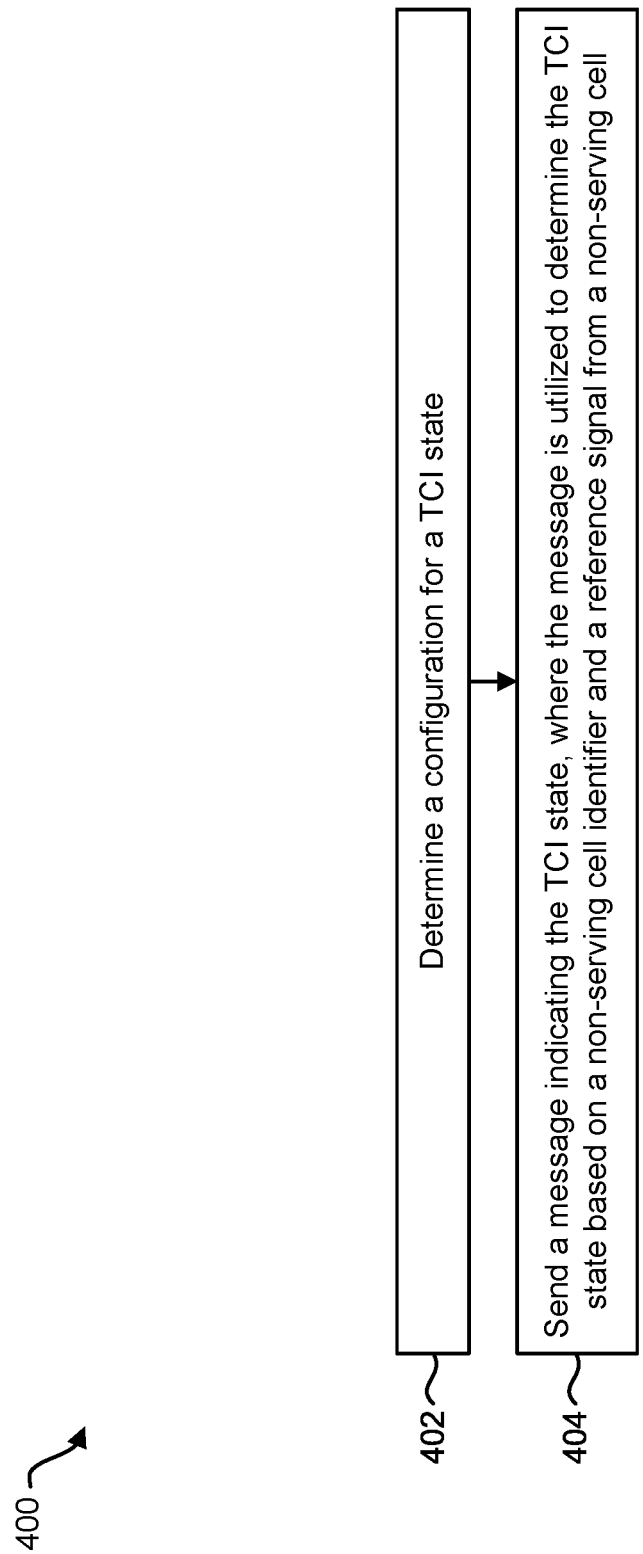
FIG. 4 is a flow diagram illustrating another example of a method for one or more non-serving cell states.

FIG. 4 is a flow diagram illustrating another example of a method 400 for one or more non-serving cell states. In some examples, the method 400 is performed by a base station (e.g., the base station 226 described in relation to FIG. 2).

A base station may determine 402 a configuration for a TCI state (e.g., a TCI state associated with one or more non-serving cells). In some examples, determining 402 a configuration for a TCI state may be performed as described in relation to FIG. 2.

The base station may send 404 a message indicating the TCI state, where the message is utilized to determine the TCI state based on a non-serving cell identifier and a reference signal from a non-serving cell. In some examples, sending 404 the message may be performed as described in relation to FIG. 2. In some examples, the message may include and/or indicate one or more non-serving cell identifiers.

In some examples, the base station may perform one or more operations based on the TCI state associated with non-serving cell(s). For example, the base station may receive a report of one or more of the values of the TCI state associated with one or more non-serving cells. For instance, the base station may receive and/or receive an indication of one or more values from a wireless communication device, where the one or more values are determined from monitoring one or more reference signals from one or more non-serving cells. In some examples, the TCI state associated with one or more non-serving cells may be utilized for one or more mobility (e.g., handover) procedures. For instance, the base station may communicate with a wireless communication device for the one or more mobility procedures. For instance, the wireless communication device may be handed off to another cell (e.g., non-serving cell or base station) with best TCI state values for handover. In some examples, one or more of the mobility procedure(s) may be performed at L1 and/or L2 (e.g., sub-L3).

Figure 5:
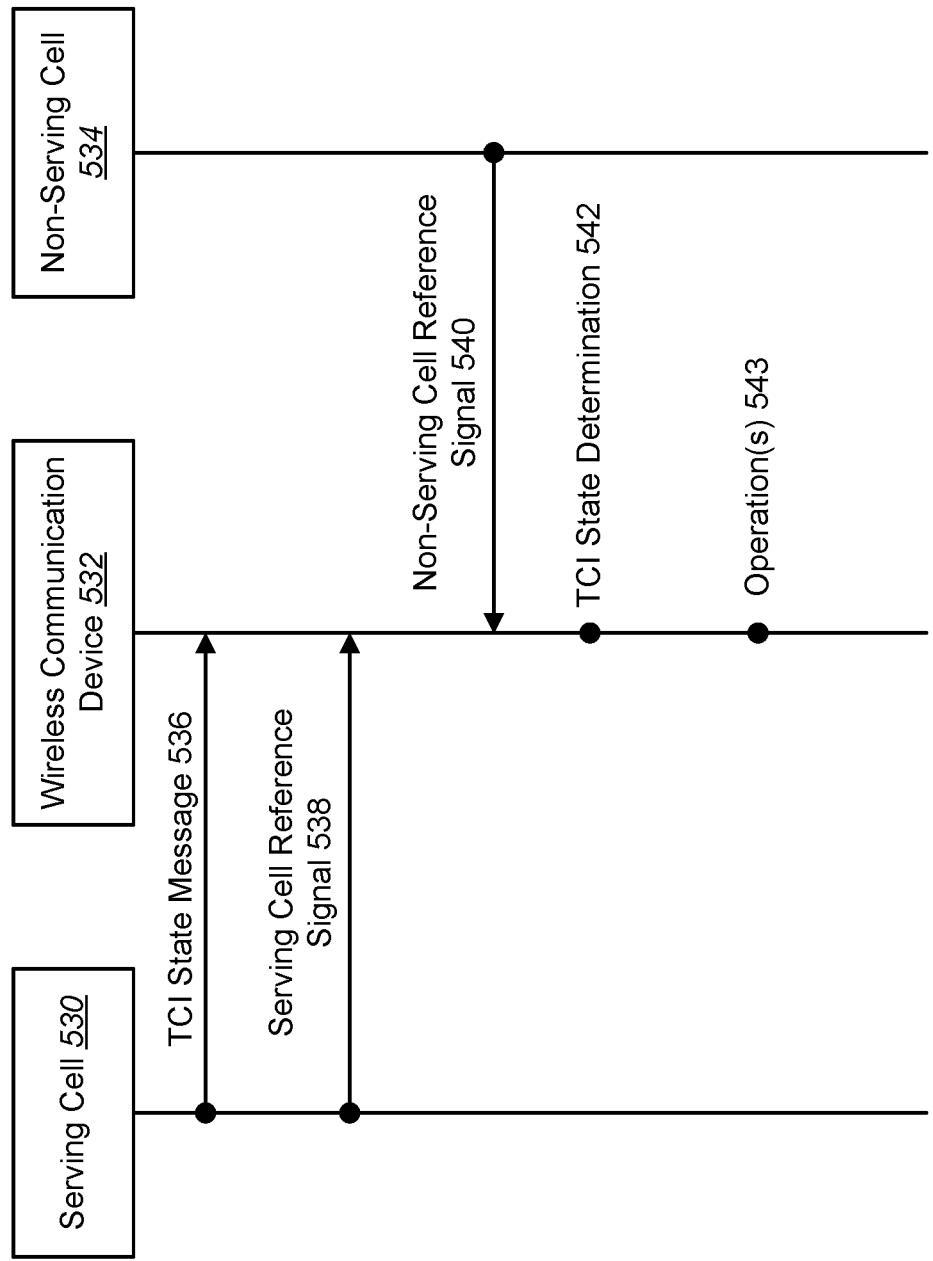
FIG. 5 is a thread diagram illustrating an example of utilization of one or more non-serving cell states in accordance with some of the techniques described herein.

FIG. 5 is a thread diagram illustrating an example of utilization of one or more non-serving cell states in accordance with some of the techniques described herein. FIG. 5 illustrates a wireless communication device 532. The wireless communication device 532 may be an example of the wireless communication device 202 described in relation to FIG. 2. FIG. 5 also illustrates a serving cell 530. The serving cell 530 may be provided by a base station (e.g., the base station 226 described in relation to FIG. 2 or another base station). FIG. 5 also illustrates a non-serving cell 534. The non-serving cell 534 may be provided by a base station (e.g., the base station 226 described in relation to FIG. 2 or another base station). One or more of the functions and/or operations described in relation to FIG. 5 may be performed as described in relation to one or more of FIGS. 1-4 in some examples.

In this example, the serving cell 530 sends a TCI state message 536 to the wireless communication device 532. For instance, the TCI state message 536 may indicate a TCI state associated with one or more non-serving cells (e.g., the non-serving cell 534). In some examples, the TCI state message 536 may be sent as a DCI message, MAC-CE message, and/or RRC message. In some approaches, the DCI message and/or MAC-CE message may be sub-layer 3 messages. In some examples, the TCI state message 536 may indicate one or more non-serving cell identifiers for reference signal monitoring and/or one or more resources for reference signal monitoring. When the TCI state message 536 is received, the wireless communication device 532 may update and/or activate (e.g., configure) a TCI state within an application time.

The serving cell 530 may send a serving cell reference signal 538. For example, the serving cell 530 may send a CSI-RS, an SSB, and/or a TRS, etc., that corresponds to the serving cell 530 to the wireless communication device 532.

The non-serving cell 534 may send a non-serving cell reference signal 540. For example, the non-serving cell 534 may send a CSI-RS, an SSB, and/or a TRS, etc., that corresponds to the non-serving cell 534. The wireless communication device 532 may receive the non-serving cell reference signal 540.

The wireless communication device 532 may perform TCI state determination 542. For instance, the wireless communication device 532 may determine the TCI state based on the non-serving cell reference signal 540. In some examples, the wireless communication device 532 may determine the TCI state based on the non-serving cell reference signal 540 and the serving cell reference signal 538.

The wireless communication device 532 may perform one or more operations 543 based on the TCI state. For example, the wireless communication device 532 may report one or more values from the TCI state and/or may perform one or more mobility (e.g., handover) procedures based on the TCI state.

Figure 6:
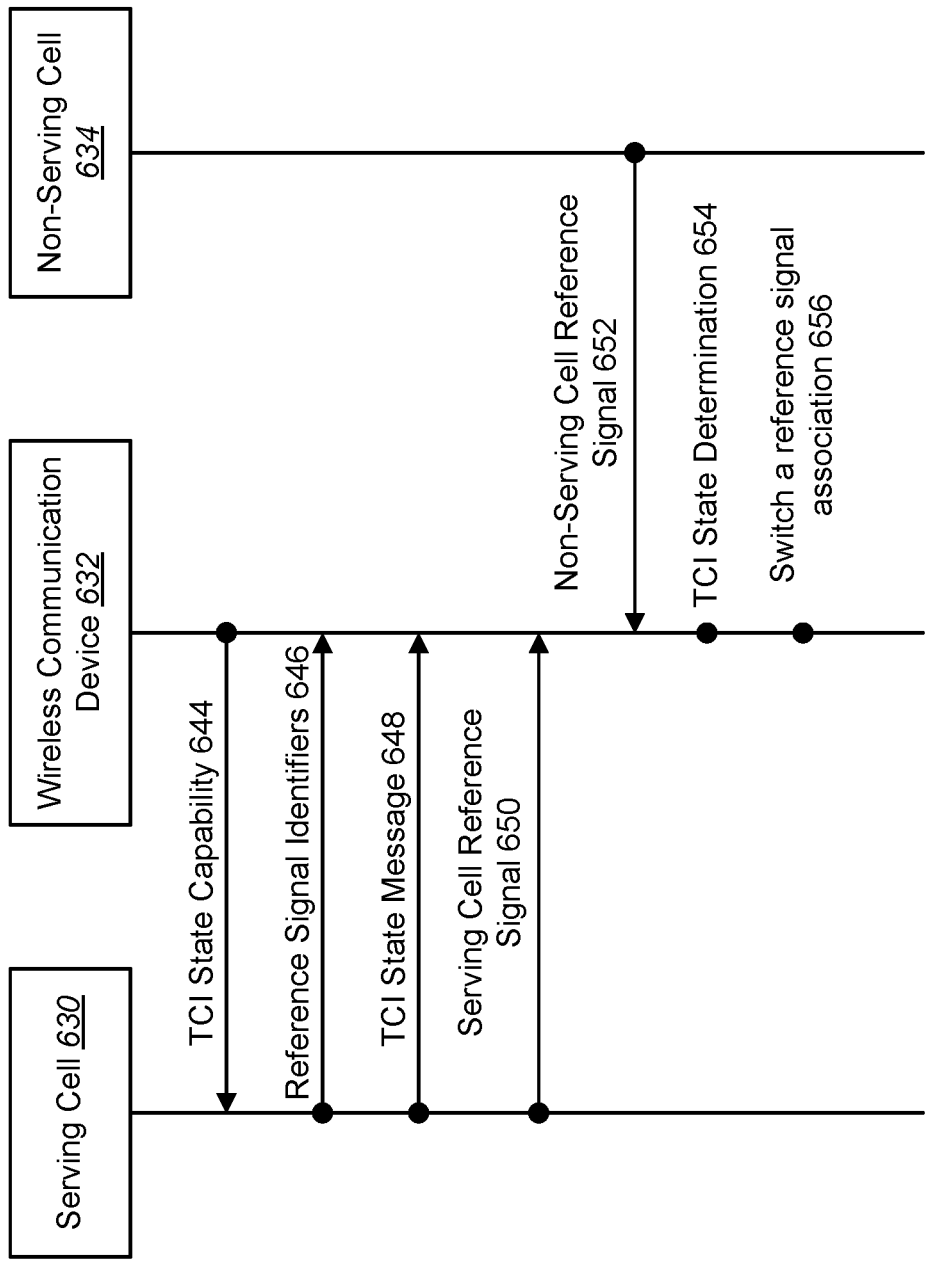
FIG. 6 is a thread diagram illustrating another example of utilization of one or more non-serving cell states in accordance with some of the techniques described herein.

FIG. 6 is a thread diagram illustrating another example of utilization of one or more non-serving cell states in accordance with some of the techniques described herein. FIG. 6 illustrates a wireless communication device 632. The wireless communication device 632 may be an example of the wireless communication device 202 described in relation to FIG. 2. FIG. 6 also illustrates a serving cell 630. The serving cell 630 may be provided by a base station (e.g., the base station 226 described in relation to FIG. 2 or another base station). FIG. 6 also illustrates a non-serving cell 634. The non-serving cell 634 may be provided by a base station (e.g., the base station 226 described in relation to FIG. 2 or another base station). One or more of the functions and/or operations described in relation to FIG. 6 may be performed as described in relation to one or more of FIGS. 1-5 in some examples.

In this example, the wireless communication device sends a TCI state capability 644. The TCI state capability 644 may indicate a capability of the wireless communication device 632 to manage one or more TCI states associated with one or more non-serving cells (e.g., the non-serving cell 634). For instance, the TCI state capability 644 may indicate a maximum number of TCI states that the wireless communication device 632 can manage (including TCI state(s) for serving cells and non-serving cells, for instance), a maximum number of non-serving cell TCI states that the wireless communication device 632 can manage, and/or a maximum number of non-serving cell TCI states per non-serving cell that the wireless communication device 632 can manage, etc.

The serving cell 630 may send reference signal identifiers 646. For example, the serving cell 630 may send a message (e.g., MeasObjectNR and/or ReferenceSignalConfig, etc.) indicating a monitoring set of reference signals.

The serving cell 630 may send a TCI state message 648 to the wireless communication device 632. For instance, the TCI state message 648 may indicate a TCI state associated with one or more non-serving cells (e.g., the non-serving cell 634). When the TCI state message 648 is received, the wireless communication device 632 may update and/or activate (e.g., configure) a TCI state within an application time.

The serving cell 630 may send a serving cell reference signal 650. For example, the serving cell 630 may send a CSI-RS, an SSB, and/or a TRS, etc., that corresponds to the serving cell 630 to the wireless communication device 632.

The non-serving cell 634 may send a non-serving cell reference signal 652. For example, the non-serving cell 634 may send a CSI-RS, an SSB, and/or a TRS, etc. that corresponds to the non-serving cell 634. The wireless communication device 632 may receive the non-serving cell reference signal 652.

The wireless communication device 632 may perform TCI state determination 654. For instance, the wireless communication device 632 may determine the TCI state based on the non-serving cell reference signal 652. In some examples, the wireless communication device 632 may determine the TCI state based on the non-serving cell reference signal 652 and the serving cell reference signal 650.

The wireless communication device 632 may switch a reference signal association 656. For instance, switching a reference signal association for the TCI state may be a mobility (e.g., handover) procedure performed based on the TCI state. In some examples, the wireless communication device 632 may perform one or more additional mobility procedures based on the TCI state that is associated with one or more non-serving cells.

Figure 7:
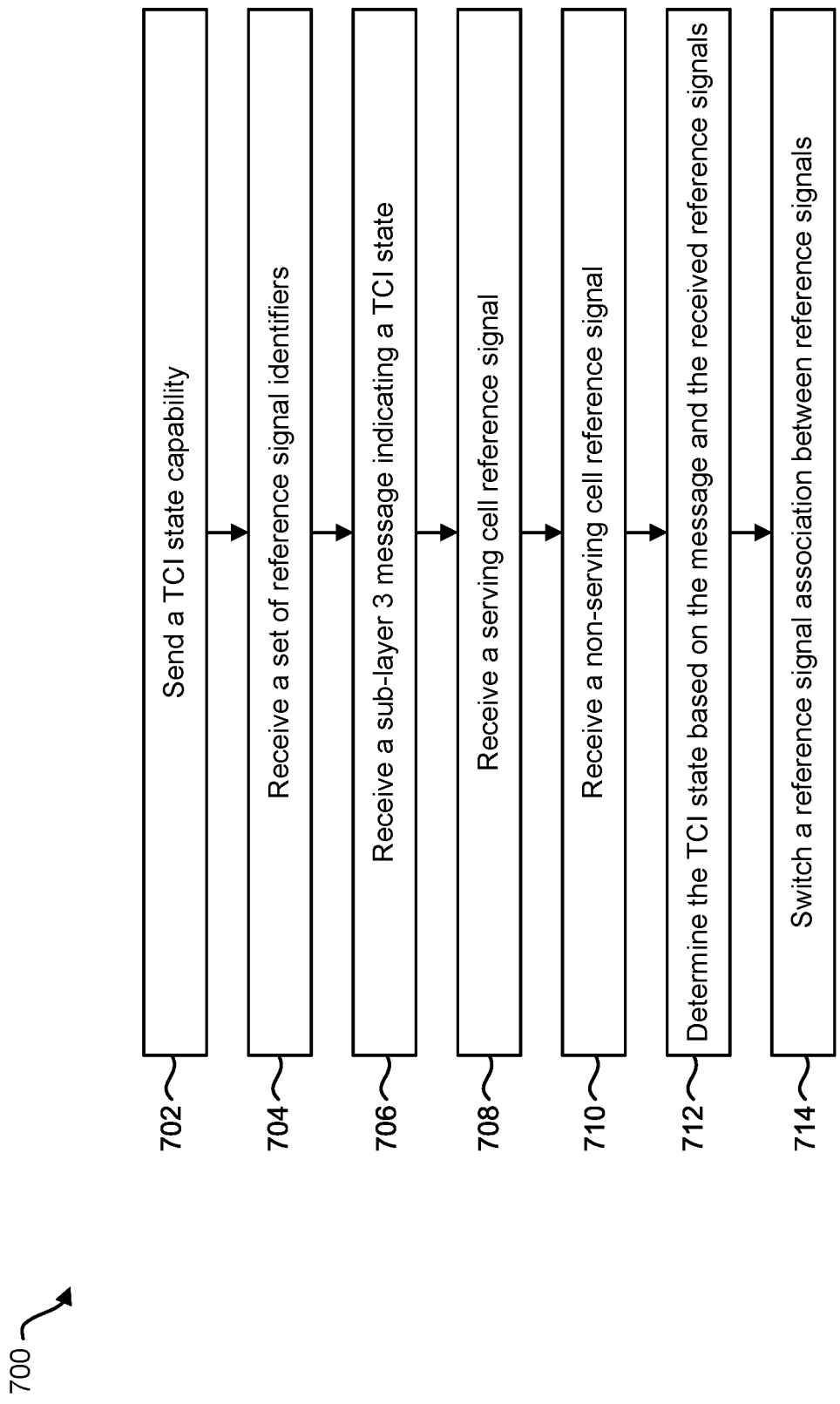
FIG. 7 is a flow diagram illustrating an example of a method for one or more non-serving cell states.

FIG. 7 is a flow diagram illustrating an example of a method 700 for one or more non-serving cell states. In some examples, the method 700 is performed by a wireless communication device (e.g., the wireless communication device 202 described in relation to FIG. 2).

A wireless communication device may send 702 a TCI state capability. In some examples, sending 702 the TCI state capability may be performed as described in relation to FIG. 2.

The wireless communication device may receive 704 a set of reference signal identifiers. In some examples, receiving 704 the set of reference signal identifiers (e.g., MeasObjectNR, and/or ReferenceSignalConfig, etc.) may be performed as described in relation to FIG. 2.

The wireless communication device may receive 706 a sub-layer 3 (e.g., L1 and/or L2) message indicating a TCI state. In some examples, receiving 706 the sub-layer 3 message may be performed as described in relation to FIG. 2.

The wireless communication device may receive 708 a serving cell reference signal. In some examples, receiving 708 the reference signal may be performed as described in relation to FIG. 2. For instance, the wireless communication device may monitor resources (e.g., time and/or frequency resource(s), BWP(s), etc., of the serving cell) to receive 708 one or more reference signals from one or more serving cells (e.g., base station(s)).

The wireless communication device may receive 710 a non-serving cell reference signal. In some examples, receiving 710 the non-serving cell reference signal may be performed as described in relation to FIG. 2.

The wireless communication device may determine 712 the TCI state based on the message and the received reference signals. In some examples, determining 712 the TCI state may be performed as described in relation to FIG. 2. For instance, the wireless communication device may utilize one or more received reference signals from the one or more serving cells and one or more non-serving cells to determine one or more values (e.g., channel state measurements, channel state information (CSI), SSB, CQI, PMI, and/or RI, etc.). The values may be measured and/or stored to determine the TCI state.

The wireless communication device may switch 714 a reference signal association between reference signals. In some examples, switching the reference signal association may be performed as described in relation to FIG. 2. For instance, the wireless communication device may switch reference signal association between reference signals in a monitored set of reference signals. In some examples, the wireless communication device may add a reference signal to the monitored set of reference signals and may switch the reference signal association to the added reference signal.

Figure 8:
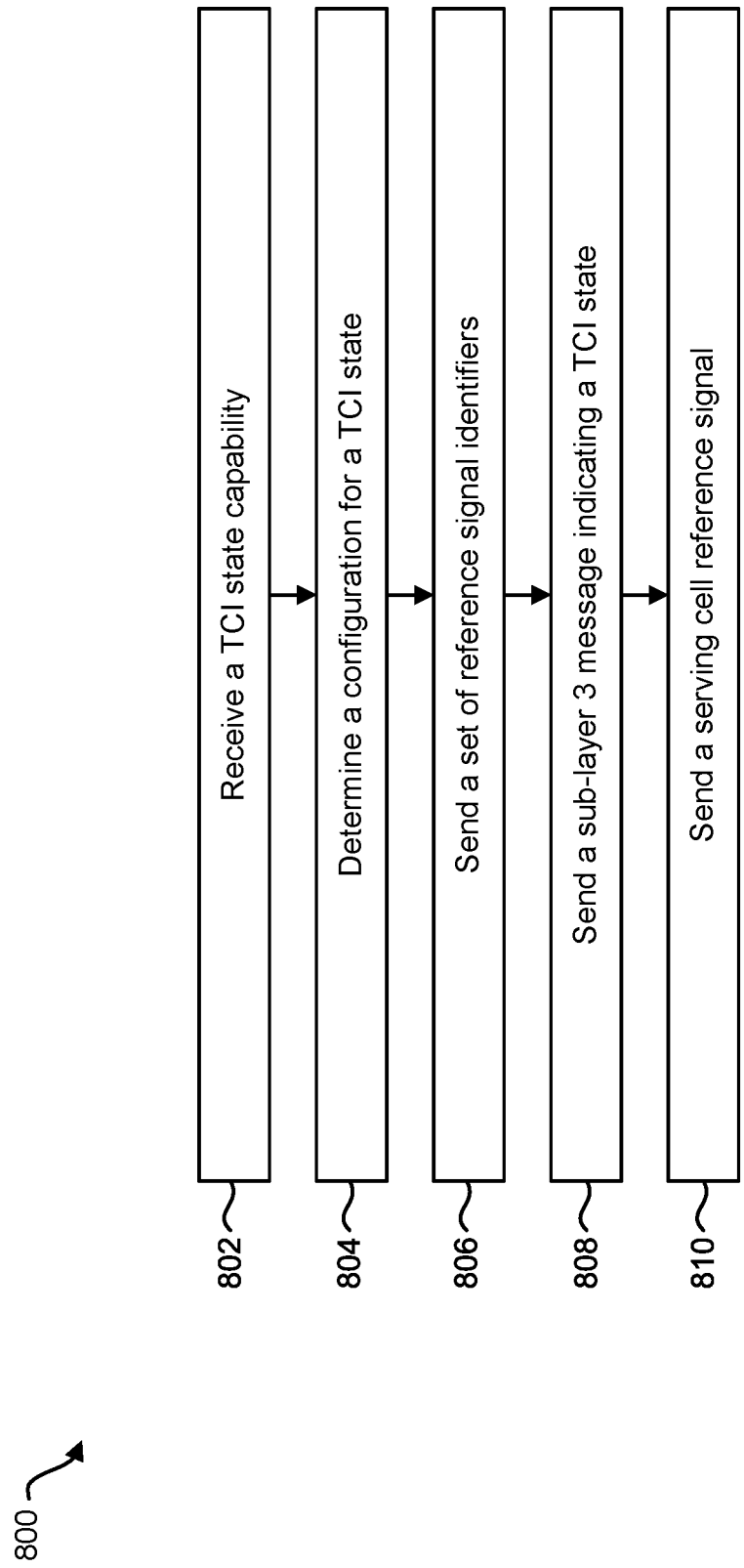
FIG. 8 is a flow diagram illustrating another example of a method for one or more non-serving cell states.

FIG. 8 is a flow diagram illustrating another example of a method 800 for one or more non-serving cell states. In some examples, the method 400 is performed by a base station (e.g., the base station 226 described in relation to FIG. 2).

A base station may receive 802 a TCI state capability. For instance, the base station may receive a message from a wireless communication device indicating the capability of the wireless communication device to manage one or more TCI states associated with one or more non-serving cells.

The base station may determine 804 a configuration for a TCI state (e.g., a TCI state associated with one or more non-serving cells). In some examples, determining 804 a configuration for a TCI state may be performed as described in relation to FIG. 2.

The base station may send 806 a set of reference signal identifiers. In some examples, sending 806 the set of reference signal identifiers (e.g., MeasObjectNR, and/or ReferenceSignalConfig, etc.) may be performed as described in relation to FIG. 2.

The base station may send 808 a sub-layer 3 message indicating a TCI state. The message may be utilized to determine the TCI state based on a non-serving cell identifier and a reference signal from a non-serving cell. In some examples, sending 808 the sub-layer 3 message (e.g., DCI, MAC-CE, etc.) may be performed as described in relation to FIG. 2.

The base station may send 810 a serving cell reference signal. In some examples, sending 810 the serving cell reference signal may be performed as described in relation to FIG. 2. In some examples, the base station may perform one or more operations based on the TCI state associated with non-serving cell(s) as described herein.

Example Wireless Communication Devices

Figure 9:
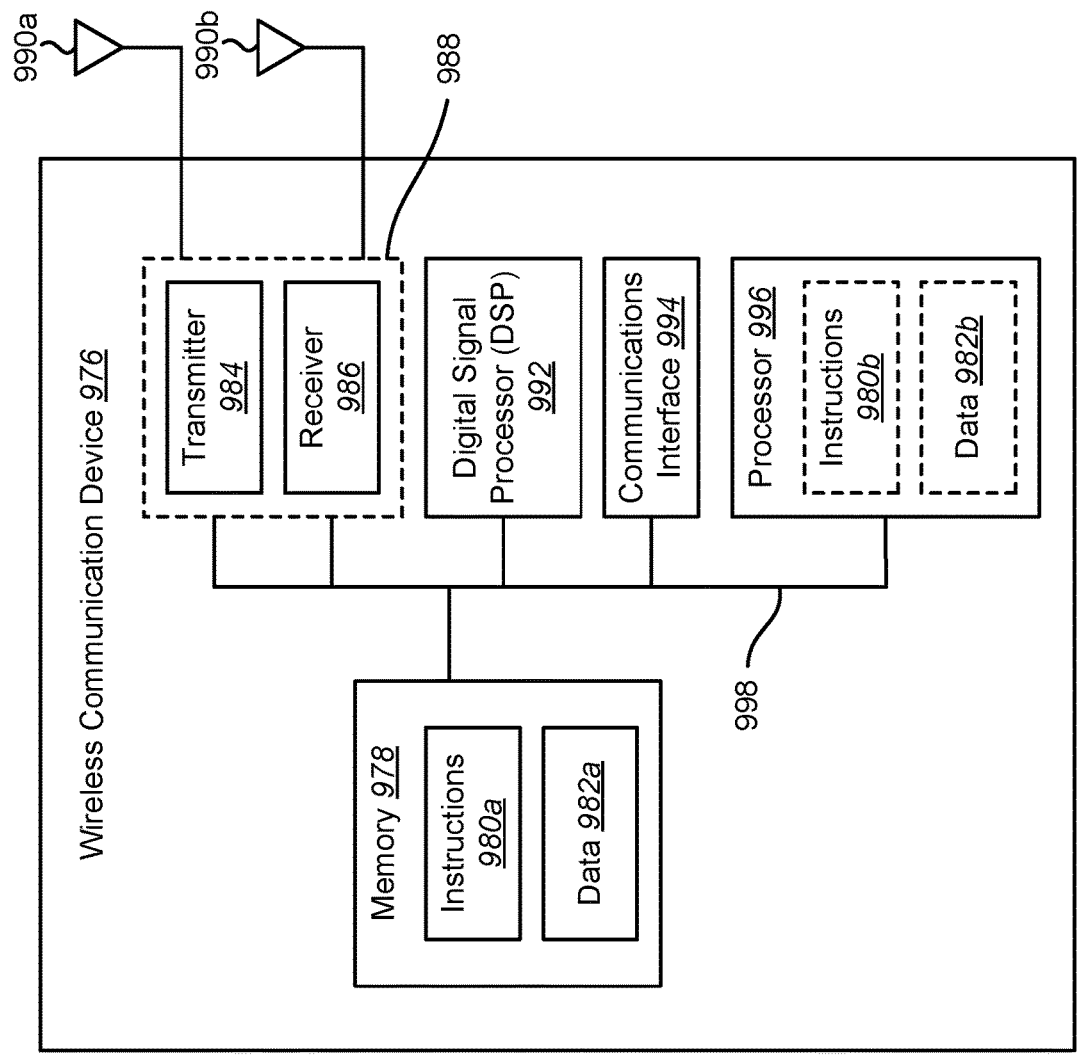
FIG. 9 illustrates certain components that may be included within a wireless communication device configured to implement various examples of the techniques for one or more non-serving cell states described herein.

FIG. 9 illustrates certain components that may be included within a wireless communication device 976 configured to implement various examples of the techniques for one or more non-serving cell states described herein. The wireless communication device 976 may be an access terminal, a mobile station, a user equipment (UE), a smartphone, a digital camera, a video camera, a tablet device, a laptop computer, a desktop computer, an Internet of Things (IoT) device, a telematics device, a base station, an access point, a vehicle, a drone, etc. The wireless communication device 976 may be implemented in accordance with one or more of the wireless communication devices (e.g., wireless communication device(s) 102, 202, 532, 632) described herein.

The wireless communication device 976 includes a processor 996. The processor 996 may be a general purpose single- or multi-chip microprocessor (e.g., an ARM), a special purpose microprocessor (e.g., a digital signal processor (DSP)), a microcontroller, a programmable gate array, etc. The processor 996 may be referred to as a central processing unit (CPU) and/or a modem processor. Although a single processor 996 is shown in the wireless communication device 976, in an alternative configuration, a combination of processors (e.g., an ARM and DSP) could be implemented.

The wireless communication device 976 also includes memory 978. The memory 978 may be any electronic component capable of storing electronic information. The memory 978 may be embodied as random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), synchronous dynamic random-access memory (SDRAM), registers, and so forth, including combinations thereof.

Data 982a and instructions 980a may be stored in the memory 978. The instructions 980a may be executable by the processor 996 to implement one or more of the methods described herein. Executing the instructions 980a may involve the use of the data 982a that is stored in the memory 978. When the processor 996 executes the instructions 980, various portions of the instructions 980b may be loaded onto the processor 996 and/or various pieces of data 982b may be loaded onto the processor 996. In some examples, the instructions 980 may be executable to implement and/or perform one or more of the methods 300, 700, and/or one or more of the functions, procedures, and/or operations described herein.

The wireless communication device 976 may also include a transmitter 984 and a receiver 986 to allow transmission and reception of signals to and from the wireless communication device 976. The transmitter 984 and receiver 986 may be collectively referred to as a transceiver 988. One or more antennas 990a-b may be electrically coupled to the transceiver 988. The wireless communication device 976 may also include (not shown) multiple transmitters, multiple receivers, multiple transceivers, and/or additional antennas.

The wireless communication device 976 may include a digital signal processor (DSP) 992. The wireless communication device 976 may also include a communications interface 994. The communications interface 994 may allow and/or enable one or more kinds of input and/or output. For example, the communications interface 994 may include one or more ports and/or communication devices for linking other devices to the wireless communication device 976. In some examples, the communications interface 994 may include the transmitter 984, the receiver 986, or both (e.g., the transceiver 988). Additionally or alternatively, the communications interface 994 may include one or more other interfaces (e.g., touchscreen, keypad, keyboard, microphone, camera, etc.). For example, the communication interface 994 may enable a user to interact with the wireless communication device 976.

The various components of the wireless communication device 976 may be coupled together by one or more buses, which may include a power bus, a control signal bus, a status signal bus, a data bus, etc. For the sake of clarity, the various buses are illustrated in FIG. 9 as a bus system 998.

Figure 10:
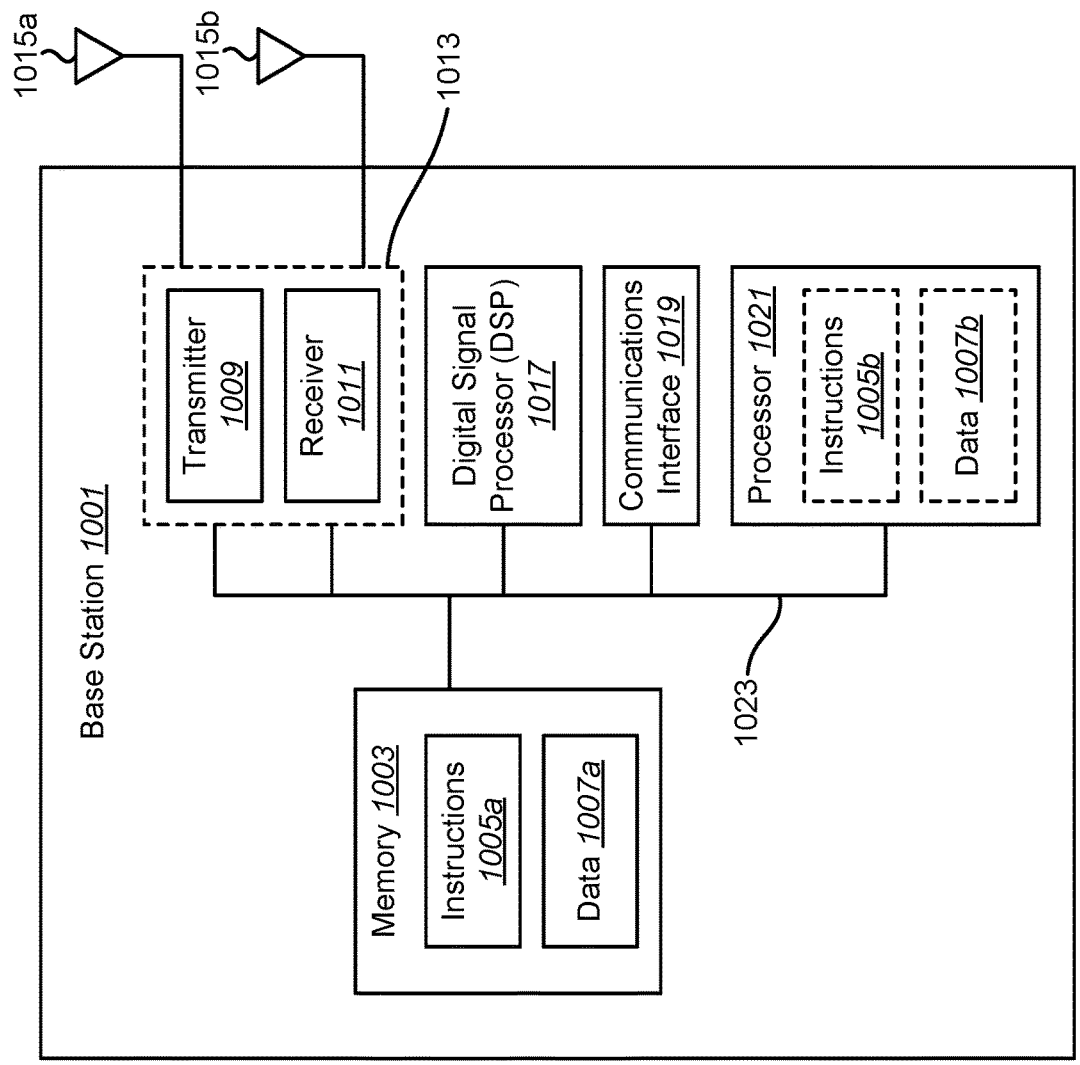
FIG. 10 illustrates certain components that may be included within a base station configured to implement various examples of the techniques for one or more non-serving cell states described herein.

FIG. 10 illustrates certain components that may be included within a base station 1001 configured to implement various examples of the techniques for one or more non-serving cell states described herein. The base station 1001 may be a Node B, eNB, gNB, access point, router, etc. The base station 1001 may be implemented in accordance with one or more of the base stations (e.g., base station(s) 112, 128, 226) described herein.

The base station 1001 includes a processor 1021. The processor 1021 may be a general purpose single- or multi-chip microprocessor (e.g., an ARM), a special purpose microprocessor (e.g., a digital signal processor (DSP)), a microcontroller, a programmable gate array, etc. The processor 1021 may be referred to as a central processing unit (CPU) and/or a modem processor. Although a single processor 1021 is shown in the base station 1001, in an alternative configuration, a combination of processors (e.g., an ARM and DSP) could be implemented.

The base station 1001 also includes memory 1003. The memory 1003 may be any electronic component capable of storing electronic information. The memory 1003 may be embodied as random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), synchronous dynamic random-access memory (SDRAM), registers, and so forth, including combinations thereof.

Data 1007a and instructions 1005a may be stored in the memory 1003. The instructions 1005a may be executable by the processor 1021 to implement one or more of the methods described herein. Executing the instructions 1005a may involve the use of the data 1007a that is stored in the memory 1003. When the processor 1021 executes the instructions 1005, various portions of the instructions 1005b may be loaded onto the processor 1021 and/or various pieces of data 1007b may be loaded onto the processor 1021. In some examples, the instructions 1005 may be executable to implement and/or perform one or more of the methods 400, 800 and/or one or more of the functions, procedures, and/or operations described herein.

The base station 1001 may also include a transmitter 1009 and a receiver 1011 to allow transmission and reception of signals to and from the base station 1001. The transmitter 1009 and receiver 1011 may be collectively referred to as a transceiver 1013. One or more antennas 1015a-b may be electrically coupled to the transceiver 1013. The base station 1001 may also include (not shown) multiple transmitters, multiple receivers, multiple transceivers, and/or additional antennas.

The base station 1001 may include a digital signal processor (DSP) 1017. The base station 1001 may also include a communications interface 1019. The communications interface 1019 may allow and/or enable one or more kinds of input and/or output. For example, the communications interface 1019 may include one or more ports and/or communication devices for linking other devices to the base station 1001. In some examples, the communications interface 1019 may include the transmitter 1009, the receiver 1011, or both (e.g., the transceiver 1013). Additionally or alternatively, the communications interface 1019 may include one or more other interfaces (e.g., touchscreen, keypad, keyboard, microphone, camera, etc.). For example, the communication interface 1019 may enable a user to interact with the base station 1001.

The various components of the base station 1001 may be coupled together by one or more buses, which may include a power bus, a control signal bus, a status signal bus, a data bus, etc. For the sake of clarity, the various buses are illustrated in FIG. 10 as a bus system 1023.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not necessarily mean "based only on." In other words, the phrase "based on" may describe "based only on" and/or "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example and not limitation, a computer-readable medium may comprise RAM, ROM, EEPROM, compact disc read-only memory (CD-ROM) or other optical disk storage, magnetic disk storage or other magnetic storage devices, or any other medium that can be used to carry or store program code in the form of instructions and/or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. A computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more functions, operations, and/or actions for achieving the described method. The method functions, operations, and/or actions may be combined, divided, and/or interchanged with one another without departing from the scope of the claims. In other words, unless a specific order of functions, operations, or actions is required for proper operation of the method that is being described, the order and/or use of specific functions, operations, and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

As used herein, the term "and/or" may mean one or more items. For example, the phrase "A, B, and/or C" may mean any of: only A, only B, only C, A and B (but not C), B and C (but not A), A and C (but not B), or all of A, B, and C. As used herein, the phrase "at least one of" may mean one or more items. For example, the phrase "at least one of A, B, and C" or the phrase "at least one of A, B, or C" may mean any of: only A, only B, only C, A and B (but not C), B and C (but not A), A and C (but not B), or all of A, B, and C. As used herein, the phrase "one or more of" may mean one or more items. For example, the phrase "one or more of A, B, and C" or the phrase "one or more of A, B, or C" may mean any of: only A, only B, only C, A and B (but not C), B and C (but not A), A and C (but not B), or all of A, B, and C.

It is to be understood that the claims are not limited to the precise configuration and components illustrated above. Various modifications, changes, and variations may be made in the arrangement, operation, and details of the systems, methods, and apparatus described herein without departing from the scope of the claims. For example, one or more of the operations, functions, elements, aspects, etc., described herein may be omitted or combined.

Example Clauses

Implementation examples are described in the following numbered clauses:

Clause 1: A wireless communication device, comprising: a receiver configured to receive a message indicating a transmission configuration indicator (TCI) state; and a processor configured to determine the TCI state based on the message, a non-serving cell identifier, and a received reference signal from a non-serving cell.

Clause 2: The wireless communication device of Clause 1, wherein the received reference signal is a channel state information reference signal (CSI-RS) or a synchronization signal block (SSB).

Clause 3: The wireless communication device of any preceding Clause, wherein the TCI state includes the non-serving cell identifier.

Clause 4: The wireless communication device of any preceding Clause, wherein quasi-colocation (QCL) information of the TCI state corresponds to non-serving cell information without serving cell information.

Clause 5: The wireless communication device of any of Clauses 1-3, wherein quasi-colocation (QCL) information of the TCI state corresponds to the non-serving cell identifier.

Clause 6: The wireless communication device of Clause 5, wherein the non-serving cell identifier is a property of the QCL information.

Clause 7: The wireless communication device of Clause 5, wherein the non-serving cell identifier is a property of a reference signal property of the QCL information.

Clause 8: The wireless communication device of Clause 5, wherein a QCL type of the QCL information indicates that the received reference signal corresponds to the non-serving cell.

Clause 9: The wireless communication device of any preceding Clause, further comprising a transmitter configured to transmit a capability report indicating a TCI state capability.

Clause 10: The wireless communication device of Clause 9, wherein the TCI state capability indicates a maximum number of TCI states for serving cells and non-serving cells.

Clause 11: The wireless communication device of Clause 9, wherein the TCI state capability indicates a maximum number of TCI states for non-serving cells.

Clause 12: The wireless communication device of Clause 9, wherein the TCI state capability indicates a maximum number of TCI states per non-serving cell.

Clause 13: The wireless communication device of Clause 9, wherein the TCI state capability indicates a maximum number of non-serving cells with reference signals configured for TCI state association.

Clause 14: wireless communication device of Clause 9, wherein the TCI state capability indicates a maximum number of physical cell identifiers (PCIs) of cells, other than a serving cell, that are associated with activated TCI states.

Clause 15: The wireless communication device of any preceding Clause, wherein a first TCI state identifier numbering space for serving cells is separate from a second TCI state identifier numbering space for non-serving cells.

Clause 16: The wireless communication device of any of Clauses 1-13, wherein a TCI state identifier numbering space is shared for serving cells and non-serving cells.

Clause 17: The wireless communication device of any preceding Clause, wherein a monitoring set of reference signals corresponding to one or more non-serving cells is based on a frequency range of serving cell reference signals and a wireless communication device capability.

Clause 18: The wireless communication device of any of Clauses 1-16, wherein a monitoring set of reference signals for sub-layer 3 mobility corresponding to one or more non-serving cells is based on a received set of reference signal identifiers.

Clause 19: The wireless communication device of any of Clauses 1-16, wherein a monitoring set of reference signals corresponding to one or more non-serving cells is based on a serving cell TCI state.

Clause 20: The wireless communication device of any of Clauses 17-19, wherein the processor is configured to determine a qualified set of reference signals based on the monitoring set of reference signals.

Clause 21: The wireless communication device of any of Clauses 1-19, wherein the processor is configured to determine a qualified set of reference signals based on a frequency range of serving cell reference signals and a wireless communication device capability.

Clause 22: The wireless communication device of any of Clauses 1-19, wherein the processor is configured to determine a qualified set of reference signals based on a first TCI state corresponding to a serving cell.

Clause 23: The wireless communication device of any of Clauses 20-22, wherein the processor is configured to select the reference signal from the qualified set of reference signals.

Clause 24: The wireless communication device of any preceding Clause, wherein the message is a downlink control information (DCI) message.

Clause 25: The wireless communication device of Clause 24, wherein the processor is configured to determine an acknowledgement (ACK) in response to the DCI message.

Clause 26: The wireless communication device of any of Clauses 1-22, wherein the message is a medium access control-control element (MAC-CE) message.

Clause 27: The wireless communication device of any preceding Clause, wherein the processor is configured to switch a reference signal association between reference signals.

Clause 28: The wireless communication device of any of Clauses 1-26, wherein the receiver is configured to receive signaling indicating a reference signal switch, and wherein the processor is configured to: add a monitored reference signal or a qualified reference signal; and switch a reference signal association to the added monitored reference signal or the added qualified reference signal.

Clause 29: The wireless communication device of any preceding Clause, wherein an application time for a non-serving cell beam is configured by a base station.

Clause 30: The wireless communication device of any of Clauses 1-28, wherein an application time for a non-serving cell beam is configured by a base station to be greater than or equal to a fixed minimum application time.

Clause 31: The wireless communication device of any of Clauses 1-28, wherein an application time for a non-serving cell beam is fixed.

Clause 32: The wireless communication device of any of Clauses 1-31, wherein a first application time for a non-serving cell beam is separate from a second application time for a serving cell.

Clause 33: A method, comprising: receiving a message indicating a transmission configuration indicator (TCI) state; and determining the TCI state based on the message, a non-serving cell identifier, and a received reference signal from a non-serving cell.

Clause 34: A non-transitory tangible computer-readable medium storing computer-executable code, comprising: code for causing a processor to control a receiver to receive a message indicating a transmission configuration indicator (TCI) state; and code for causing the processor to determine the TCI state based on the message, a non-serving cell identifier, and a received reference signal from a non-serving cell.

Clause 35: An apparatus, comprising: means for receiving a message indicating a transmission configuration indicator (TCI) state; and means for determining the TCI state based on the message, a non-serving cell identifier, and a received reference signal from a non-serving cell.

Clause 36: A base station, comprising: a transmitter configured to send a message indicating a transmission configuration indicator (TCI) state, wherein the message is utilized to determine the TCI state based on a non-serving cell identifier and a reference signal from a non-serving cell.

Clause 37: The base station of Clause 36, wherein the reference signal is a channel state information reference signal (CSI-RS) or a synchronization signal block (SSB).

Clause 38: The base station of any of Clauses 36-37, wherein the TCI state includes the non-serving cell identifier.

Clause 39: The base station of any of Clauses 36-38, wherein quasi colocation (QCL) information of the TCI state includes non-serving cell information without serving cell information.

Clause 40: The base station of any of Clauses 36-38, wherein quasi colocation (QCL) information of the TCI state includes the non-serving cell identifier.

Clause 41: The base station of Clause 40, wherein the non-serving cell identifier is a property of the QCL information.

Clause 42: The base station of Clause 40, wherein the non-serving cell identifier is a property of a reference signal property of the QCL information.

Clause 43: The base station of Clause 40, wherein a QCL type of the QCL information indicates that the reference signal corresponds to the non-serving cell.

Clause 44: The base station of any of Clauses 36-43, further comprising a receiver configured to receive a capability report indicating a TCI state capability.

Clause 45: The base station of Clause 44, wherein the TCI state capability indicates a maximum number of TCI states for serving cells and non-serving cells.

Clause 46: The base station of Clause 44, wherein the TCI state capability indicates a maximum number of TCI states for non-serving cells.

Clause 47: The base station of Clause 44, wherein the TCI state capability indicates a maximum number of TCI states per non-serving cell.

Clause 48: The base station of Clause 44, wherein the TCI state capability indicates a maximum number of non-serving cells with reference signals configured for TCI state association.

Clause 49: The base station of Clause 44, wherein the TCI state capability indicates a maximum number of physical cell identifiers (PCIs) of cells, other than a serving cell, that are associated with activated TCI states.

Clause 50: The base station of any of Clauses 36-49, wherein a first TCI state identifier numbering space for serving cells is separate from a second TCI state identifier numbering space for non-serving cells.

Clause 51: The base station of any of Clauses 36-49, wherein a TCI state identifier numbering space is shared for serving cells and non-serving cells.

Clause 52: The base station of any of Clauses 36-51, wherein a monitoring set of reference signals corresponding to one or more non-serving cells is based on a frequency range of serving cell reference signals and a wireless communication device capability.

Clause 53: The base station of any of Clauses 36-51, wherein a monitoring set of reference signals for sub-layer 3 mobility corresponding to one or more non-serving cells is based on a set of reference signal identifiers.

Clause 54: The base station of any of Clauses 36-51, wherein a monitoring set of reference signals corresponding to one or more non-serving cells is based on a serving cell TCI state.

Clause 55: The base station of any of Clauses 52-54, wherein a qualified set of reference signals is based on the monitoring set of reference signals.

Clause 56: The base station of any of Clauses 36-54, wherein a qualified set of reference signals is based on a frequency range of serving cell reference signals and a wireless communication device capability.

Clause 57: The base station of any of Clauses 36-54, wherein a qualified set of reference signals is based on a first TCI state corresponding to a serving cell.

Clause 58: The base station of any of Clauses 55-57, wherein the reference signal is selected from the qualified set of reference signals.

Clause 59: The base station of any of Clauses 36-58, wherein the message is a downlink control information (DCI) message.

Clause 60: The base station of Clause 59, wherein an acknowledgement (ACK) is received in response to the DCI message.

Clause 61: The base station of any of Clauses 36-58, wherein the message is a medium access control-control element (MAC-CE) message.

Clause 62: The base station of any of Clauses 36-61, wherein the message indicates a switch in reference signal association between reference signals.

Clause 63: The base station of any of Clauses 36-61, wherein the message indicates: adding a monitored reference signal or a qualified reference signal; and switching a reference signal association to the added monitored reference signal or the added qualified reference signal.

Clause 64: The base station of any of Clauses 36-63, wherein an application time for a non-serving cell beam is configured by the base station.

Clause 65: The base station of any of Clauses 36-63, wherein an application time for a non-serving cell beam is configured by the base station to be greater than or equal to a fixed minimum application time.

Clause 66: The base station of any of Clauses 36-63, wherein an application time for a non-serving cell beam is fixed.

Clause 67: The base station of any of Clauses 36-63, wherein a first application time for a non-serving cell beam is separate from a second application time for a serving cell.

Clause 68: A method, comprising: sending a message indicating a transmission configuration indicator (TCI) state, wherein the message is utilized to determine the TCI state based on a non-serving cell identifier and a reference signal from a non-serving cell.

Clause 69: A non-transitory tangible computer-readable medium storing computer-executable code, comprising: code for causing a processor to control a transmitter to transmit a message indicating a transmission configuration indicator (TCI) state, wherein the message is utilized to determine the TCI state based on a non-serving cell identifier and a reference signal from a non-serving cell.

Clause 70: An apparatus, comprising: means for transmitting a message indicating a transmission configuration indicator (TCI) state, wherein the message is utilized to determine the TCI state based on a non-serving cell identifier and a reference signal from a non-serving cell.

What is claimed is:

1. A wireless communication device, comprising:
   a communications interface; and
   a processor coupled to the communications interface, wherein the wireless communication device is configured to:
      transmit transmission configuration indicator (TCI) state capability information, wherein the TCI state capability information indicates at least one of: a maximum number of TCI states for serving cells and non-serving cells, a maximum number of TCI states for non-serving cells, a maximum number of TCI states for all non-serving cells, a maximum number of TCI states per non-serving cell, a maximum number of non-serving cells with reference signals configured for TCI state association, or a maximum number of physical cell identifiers (PCIs) of cells, other than a serving cell, that are associated with activated TCI states;
      receive a TCI state message; and
      determine a TCI state based on the TCI state message, a non-serving cell identifier, and a reference signal corresponding to a non-serving cell.

2. The wireless communication device of claim 1, wherein the reference signal is a channel state information reference signal (CSI-RS) or a synchronization signal block (SSB).

3. The wireless communication device of claim 1, wherein the TCI state message includes the non-serving cell identifier.

4. The wireless communication device of claim 1, wherein the TCI state message includes quasi-colocation (QCL) information corresponding to non-serving cell information without the serving cell information.

5. The wireless communication device of claim 1, wherein the TCI state message includes quasi-colocation (QCL) information and the QCL information corresponds to the non-serving cell identifier.

6. The wireless communication device of claim 5, wherein the non-serving cell identifier is a property of at least one of: the QCL information or a reference signal property of the QCL information.

7. The wireless communication device of claim 5, wherein a QCL type of the QCL information indicates that the reference signal corresponds to the non-serving cell.

8. The wireless communication device of claim 1, wherein a first TCI state identifier numbering space for serving cells is separate from a second TCI state identifier numbering space for non-serving cells.

9. The wireless communication device of claim 1, wherein a TCI state identifier numbering space is shared for serving cells and non-serving cells.

10. The wireless communication device of claim 1, wherein a monitoring set of reference signals corresponding to one or more non-serving cells is based on a frequency range of serving cell reference signals and a capability of the wireless communication device.

11. The wireless communication device of claim 10, wherein the wireless communication device is configured to determine a qualified set of reference signals based on the monitoring set of reference signals.

12. The wireless communication device of claim 11, wherein the wireless communication device is configured to select the reference signal from the qualified set of reference signals.

13. The wireless communication device of claim 1, wherein the monitoring set of reference signals for sub-layer 3 mobility corresponding to the one or more non-serving cells is based on a received set of reference signal identifiers.

14. The wireless communication device of claim 1, wherein the monitoring set of reference signals is based on a serving cell TCI state.

15. The wireless communication device of claim 1, wherein the wireless communication device is configured to determine a qualified set of reference signals based on a frequency range of serving cell reference signals and a capability of the wireless communication device.

16. The wireless communication device of claim 1, wherein the wireless communication device is configured to determine a qualified set of reference signals based on a first TCI state corresponding to a particular serving cell.

17. The wireless communication device of claim 1, wherein the TCI state message is a downlink control information (DCI) message or a medium access control-control element (MAC-CE) message.

18. The wireless communication device of claim 1, wherein the wireless communication device is configured to switch a reference signal association between reference signals.

19. The wireless communication device of claim 1, wherein the wireless communication device is configured to:
   receive signaling indicating a reference signal switch;
   add a monitored reference signal or a qualified reference signal; and
   switch a reference signal association to the monitored reference signal or the qualified reference signal.

20. The wireless communication device of claim 1, wherein an application time for a non-serving cell beam is configured by a base station.

21. The wireless communication device of claim 1, wherein an application time for a non-serving cell beam is configured by a base station to be greater than or equal to a fixed minimum application time.

22. The wireless communication device of claim 1, wherein a first application time for a non-serving cell beam is at least one of fixed or separate from a second application time for a particular serving cell.

23. The wireless communication device of claim 1, wherein the wireless communication device is configured to perform one or more operations based on the TCI state.

24. The wireless communication device of claim 1, wherein all quasi-colocation (QCL) information in the TCI state message corresponds to reference signals that correspond to a same non-serving cell.

25. The wireless communication device of claim 1, wherein the TCI state capability information indicates the maximum number of TCI states for serving cells and non-serving cells.

26. The wireless communication device of claim 1, wherein the TCI state capability information indicates the maximum number of TCI states for non-serving cells.

27. The wireless communication device of claim 1, wherein the TCI state capability information indicates the maximum number of TCI states for all non-serving cells.

28. The wireless communication device of claim 1, wherein the TCI state capability information indicates the maximum number of TCI states per non-serving cell.

29. The wireless communication device of claim 1, wherein the TCI state capability information indicates the maximum number of non-serving cells with reference signals configured for TCI state association.

30. The wireless communication device of claim 1, wherein the TCI state capability information indicates the maximum number of PCIs of cells.

31. A wireless communication device, comprising:
   a communications interface; and
   a processor coupled to the communications interface, wherein the wireless communication device is configured to:
      receive a transmission configuration indicator (TCI) state message including quasi-colocation (QCL) information corresponding to non-serving cell information without serving cell information; and
      determine a TCI state based on the TCI state message, a non-serving cell identifier, and a reference signal corresponding to a non-serving cell.

32. The wireless communication device of claim 31, wherein the wireless communication device is configured to perform one or more operations based on the TCI state.

33. A wireless communication device, comprising:
   a communications interface; and
   a processor coupled to the communications interface, wherein the wireless communication device is configured to:
      receive a transmission configuration indicator (TCI) state message, wherein all quasi-colocation (QCL) information in the TCI state message corresponds to reference signals that correspond to a same non-serving cell; and
      determine a TCI state based on the TCI state message and a non-serving cell identifier.

34. The wireless communication device of claim 33, wherein the wireless communication device is configured to perform one or more operations based on the TCI state.

\* \* \* \* \*